US010878283B2

(12) United States Patent
Kurita et al.

(10) Patent No.: US 10,878,283 B2
(45) Date of Patent: Dec. 29, 2020

(54) DATA GENERATION APPARATUS, DATA GENERATION METHOD, AND DATA GENERATION PROGRAM

(71) Applicant: OMRON Corporation, Kyoto (JP)

(72) Inventors: Masashi Kurita, Kizugawa (JP); Yuki Hanzawa, Nara (JP)

(73) Assignee: OMRON CORPORATION, Kyoto (JP)

( * ) Notice: Subject to any disclaimer, the term of this patent is extended or adjusted under 35 U.S.C. 154(b) by 157 days.

(21) Appl. No.: 16/163,250

(22) Filed: Oct. 17, 2018

(65) Prior Publication Data
US 2019/0197356 A1 Jun. 27, 2019

(30) Foreign Application Priority Data
Dec. 25, 2017 (JP) .................................. 2017-248162

(51) Int. Cl.
G06K 9/62 (2006.01)
(52) U.S. Cl.
CPC ......... G06K 9/6256 (2013.01); G06K 9/6254 (2013.01); G06K 9/6262 (2013.01); G06K 9/6263 (2013.01); G06K 2209/19 (2013.01)
(58) Field of Classification Search
CPC .. G06K 9/6256; G06K 9/6254; G06K 9/6262; G06K 9/6263
See application file for complete search history.

(56) References Cited

U.S. PATENT DOCUMENTS

| 2003/0202703 | A1* | 10/2003 | Ogi | ................... | G06T 7/0004 |
| | | | | | 382/224 |
| 2008/0063254 | A1* | 3/2008 | Tanizaki | ............... | G06T 7/0004 |
| | | | | | 382/141 |
| 2017/0069075 | A1* | 3/2017 | Okuda | .................... | G06T 11/60 |
| 2017/0249766 | A1* | 8/2017 | Namiki | ............... | G06K 9/6255 |
| 2018/0307946 | A1* | 10/2018 | Kuroda | ............... | G06K 9/6259 |
| 2019/0197356 | A1* | 6/2019 | Kurita | ................. | G06K 9/6256 |

FOREIGN PATENT DOCUMENTS

| JP | 2003-317082 A | 11/2003 |
| JP | 2006-293528 A | 10/2006 |
| JP | 2016-143353 A | 8/2016 |
| WO | 2017/073373 A1 | 5/2017 |

OTHER PUBLICATIONS

Extended European search report dated May 9, 2019 in a counterpart European patent application.

* cited by examiner

Primary Examiner — Md K Talukder
(74) Attorney, Agent, or Firm — METROLEX IP LAW GROUP, PLLC

(57) ABSTRACT

A data generation apparatus includes: an acquisition unit configured to acquire a result determined by a determination unit, which uses an identification device trained using learning data, as to whether or not an object to be inspected includes a part to be detected based on an image of the object to be inspected; an evaluation unit configured to evaluate whether or not the determination result is correct; and a generation unit configured to generate, if the evaluation unit has evaluated that the determination result is not correct, new learning data by associating at least one of the image and a composite image generated based on the image with information in which the determination result is corrected.

19 Claims, 12 Drawing Sheets

DATA GENERATION APPARATUS, DATA GENERATION METHOD, AND DATA GENERATION PROGRAM

CROSS-REFERENCES TO RELATED APPLICATIONS

This application claims priority to Japanese Patent Application No. 2017-248162 filed Dec. 25, 2017, the entire contents of which are incorporated herein by reference.

FIELD

The disclosure relates to a data generation apparatus, a data generation method, and a data generation program.

BACKGROUND

In recent years, technologies for identifying images using an identification device such as a neural network have been studied. The identification device may be trained using learning data (teaching data) that includes learning images and correct identification results on the images.

With respect to effectively generating learning data, JP 2003-317082A discloses a classification support apparatus that includes a display unit for displaying images of a plurality of objects to be inspected, an input unit for accepting input for classifying the images of the plurality of objects to be inspected, and a processing unit that performs processing for determining the display order of the objects to be inspected in the display unit based on the sizes or the like of the objects to be inspected indicated by images of the objects to be inspected that have been prepared in advance, and processing for arranging and displaying the images of the plurality of objects to be inspected in the display unit.

Also, with respect to training of an identification device, JP 2016-143353A discloses a learning apparatus that includes a recognition processing unit that performs recognition processing on data to be recognized (recognition data), a learning control unit that extracts a portion of the recognition data, and creates relearning data including the extracted recognition data, and a learning processing unit that learns processing parameters of the recognition processing unit using learning target data including the relearning data. Specifically, the learning control unit extracts some information, included in the recognition data that has been used for learning by the learning processing unit, that contributes more to the processing parameters in the learning, and creates relearning data in which a recognition result is added to the extracted recognition data. Furthermore, a learning apparatus is disclosed in which the learning processing unit learns the processing parameters of the recognition processing unit such that the recognition result of the recognition processing unit with respect to the learning target data included in the relearning data matches the recognition result that has been added to the learning target data.

JP 2003-317082A and JP 2016-143353A are examples of background art.

SUMMARY

When a defect included in an object to be inspected is identified by an identification device that is created using learning data, the identification accuracy depends on the content of the learning data that is used in learning. For example, in the case of identifying, based on an image, whether or not the object to be inspected includes a defect, it is difficult to generate an identification device that can handle various types of defects, which are to be identified, and has a high identification accuracy, unless the learning data includes a sufficient number of and sufficient types of images in which a defect is not captured, and images in which a defect is captured.

When the learning data is accumulated, in order to sufficiently improve the identification accuracy of an identification device, and continuously improve the identification accuracy, it is required that, not only images including features that can be identified by the identification device, but also images including features for which the identification device could not output a desirable identification result needs to be added as the learning data.

In view of this, an aspect may provide a data generation apparatus, a data generation method, and a data generation program for accumulating, as learning data, images that include features for which an identification device could not output a desirable identification result.

A data generation apparatus according to an aspect of this disclosure includes: a processor (such as a central processing unit (CPU), graphical processing unit (GPU), field programmable gate array (FGPA), etc) configured with a program to perform operations as units of the data generation apparatus, an acquisition unit configured to acquire a result determined by a determination unit, which uses an identification device trained using learning data, as to whether or not an object to be inspected includes a part to be detected based on an image of the object to be inspected; an evaluation unit configured to evaluate the result determined by the determination unit; and a generation unit configured to generate, if the evaluation unit has evaluated that the determination result is not correct, a new learning data by associating at least one of the image and a composite image generated based on the image with information in which the determination result is corrected. Here, the learning data includes image data to be input to an identification device, and data that indicates at least a correct determination result with respect to the image data, and that can be compared with the output of the identification device. Also, the information in which the determination result is corrected may be information regarding a correct determination result, and may be information indicating that an image of the object to be inspected included no defect, or may be information indicating that the image includes a defect, for example. Also, the part to be detected may be any part included in the object to be inspected, and may be a defective part included in the object to be inspected, for example. Note that a composite image generated based on an image may be an image obtained by performing predetermined processing on the image, or may be an image generated by combining at least a part of the image and another image.

According to an aspect, when the result determined by the determination unit is evaluated to be incorrect, as a result of generating new learning data by associating information in which the determination result is corrected with at least one of the image and a composite image generated based on the image, an image including a feature with respect to which the identification device could not output a desirable identification result can be accumulated as the learning data. Accordingly, an identification device can be trained using an image that the identification device is not good at recognizing, and as a result, the amount of calculation and the calculation time until the result is output can be reduced.

Also, the identification accuracy of an identification device can be improved, and the identification accuracy can be continuously improved.

In an aspect, the generation unit may generate new learning data by adding information regarding whether or not a part to be detected is included, that is different between a case of a first erroneous determination in which the determination unit determined that the object to be inspected includes a part to be detected, and the evaluation unit has evaluated that the determination result is not correct, and a case of a second erroneous determination in which the determination unit determined that the object to be inspected includes no part to be detected, and the evaluation unit has evaluated that the determination result is not correct.

According to an aspect, as a result of generating new learning data by adding information indicating whether or not a part to be detected is included that is different between the case of first erroneous determination, that is, the case of false positive in which a defect has been erroneously detected, and the case of second erroneous determination, that is, the case of false negative in which a defect has been overlooked, learning data can be appropriately generated using processing appropriate for reducing the first erroneous determination and processing appropriate for reducing the second erroneous determination, and learning data can be generated with which the identification accuracy of an identification device can be efficiently improved.

In an aspect, the generation unit may generate a learning data set by mixing the new learning data generated in the case of the first erroneous determination and the new learning data generated in the case of the second erroneous determination. The learning data set may be generated by randomly mixing the new learning data generated in the case of the first erroneous determination and the new learning data generated in the case of the second erroneous determination.

According to an aspect, as a result of mixing the learning data appropriate for reducing the first erroneous determination and the learning data appropriate for reducing the second erroneous determination, a learning data set with which both types of erroneous determination can be reduced can be generated, and a learning data set with which the identification accuracy of the identification device can be efficiently improved can be generated.

In an aspect, the generation unit may, in the case of the first erroneous determination, generate the new learning data by associating the image with information indicating that at least a partial image of the image based on which the determination has been made includes no part to be detected. Here, the information indicating that no defect is included may be information indicating that a specific region of the image includes no defect.

According to an aspect, in the case of the first erroneous determination, as a result of associating the image with information indicating that a partial image of the image based on which the determination has been made includes no part to be detected, the portion of the image based on which the identification device erroneously determined that a part to be detected is included can be specified, and can be shown to include no part to be detected. Therefore, even if the identification device erroneously detected a part to be detected, the occurrence of the erroneous detection can be suppressed, and learning data with which the identification accuracy of the identification device can be improved can be generated.

In an aspect, the generation unit may, in the case of the first erroneous determination, generate the new learning data by generating a composite image obtained by combining a partial image of the image based on which the determination has been made and an image that is different from the image including the partial image, and by associating the composite image with information indicating that no part to be detected is included.

According to an aspect, as a result of generating a composite image, in the case of the first erroneous determination, by combining the partial image based on which the determination unit has determined that a part to be detected is included with an image that is different from the image from which the partial image has been extracted, the variation of images that do not actually include a defect, but will be erroneously determined by the determination unit that a part to be detected is included can be increased, and learning data with which the number of erroneous determinations can be reduced can be generated by generating images similar to the image that has been erroneously determined that a part to be detected is included. With this, various composite images with which erroneous determination may be made are generated from one image subject to an erroneous determination, and learning data with which the identification accuracy of an identification device can be improved so that whether or not the object to be inspected includes a part to be detected can be identified with higher accuracy can be generated.

In an aspect, the generation unit may, in the case of the second erroneous determination, generate the new learning data by associating the image with information indicating that at least the image includes a part to be detected. Here, the information indicating that a part to be detected is included may be information indicating that a specific region of the image includes the part to be detected.

According to an aspect, in the case of the second erroneous determination, as a result of associating the image with information indicating that a part to be detected is included in the image, an image with respect to which the identification device has erroneously determined that no part to be detected is included in the image can be specified, and learning data can be generated with which the identification accuracy of an identification device can be improved.

In an aspect, information indicating that the part to be detected is included includes information indicating a region of the image that includes the part to be detected. The data generation apparatus further includes a correction unit configured to correct information indicating the region by expanding at least a portion of an outer edge of the region so that the number of pixels included in the region is increased by a predetermined amount. The generation unit may generate learning data by associating the image with information indicating the corrected region.

According to an aspect, in the case of the second erroneous determination, the position of a part to be detected is specified by information indicating the region, of the image, that includes the part to be detected, the region is corrected such that at least a portion of the outer edge of the region is expanded, and then, the image is associated with information indicating the region. With this, even if a region including a part to be detected is designated as including almost only the part to be detected (or part to be detected), then the region is corrected such that at least a portion of an outer edge of the region is expanded, and learning data can be generated with which an identification device can be trained so as to appropriately identify a feature of a part to be detected included in the object to be inspected based on an image. As a result, the accuracy of the identification device for identifying a defect that has been trained using the learning data can be improved.

In an aspect, the generation unit may, in the case of the second erroneous determination, generate the composite image by combining a partial image, of the image, that includes the part to be detected and an image that is different from the image including the partial image, and generate the new learning data by associating the composite image with information indicating that a part to be detected is included.

According to an aspect, as a result of generating a composite image, in the case of the second erroneous determination, by combining a partial image including a part to be detected with an image that is different from the image including the partial image, the variation of images that actually include a part to be detected, but will be erroneously determined by the determination unit 152 that no part to be detected is included can be increased, and learning data with which the number of erroneous determinations can be reduced can be generated by generating images similar to the image that has been erroneously determined that no part to be detected is included. With this, various composite images with which erroneous determination may be made are generated from one image subject to an erroneous determination, and learning data with which the identification accuracy of an identification device can be improved so that whether or not the object to be inspected includes a part to be detected can be identified with higher accuracy can be generated.

In an aspect, the part to be detected is a defective part included in the object to be inspected, and the data generation apparatus may further include a verification unit configured to cause the determination unit to determine whether or not the composite image includes a defect, and verify whether or not the first erroneous determination or the second erroneous determination is made. Here the determination result of the first erroneous determination or the second erroneous determination may be, for example, a determination result that is obtained when, if the first erroneous determination has been made with the original image, the first erroneous determination is also made with the composite image, and if the second erroneous determination has been made with the original image, the second erroneous determination is also made with the composite image. Hereinafter, the determination result of the first erroneous determination or the second erroneous determination may be expressed as a "similar determination result".

According to an aspect, it can be verified if a composite image has been generated with which a determination result can be obtained that is similar to the determination result obtained for the original image that incurs the first erroneous determination or the second erroneous determination, and it can be confirmed that the generated composite image is useful for reducing the number of erroneous determinations.

In an aspect, the data generation apparatus may further include a processor (such as a central processing unit (CPU), graphical processing unit (GPU), field programmable gate array (FGPA), etc) configured with a program to perform operations as units of the data generation apparatus, a communication unit configured to, when the generation unit generates the new learning data, inquire of an authorized person as to whether or not the new learning data should be registered, while notifying the authorized person of information indicating which of the first erroneous determination and the second erroneous determination has been made. Here, the authorized person is a person having the authority to correct the determination by a worker who operates the input unit, and is a person having the authority to manage the generation of the learning data.

According to an aspect, as a result of inquiring of the authorized person, when new learning data is generated, whether or not the new learning data is to be registered, while notifying the authorized person of the type of erroneous determination, the new learning data is prevented from being easily registered, and learning data having an appropriate content can be accumulated.

An inspection apparatus according to another aspect of this disclosure includes a processor (such as a central processing unit (CPU), graphical processing unit (GPU), field programmable gate array (FGPA), etc) configured with a program to perform operations as units of the inspection apparatus, a determination unit configured to determine whether or not the object to be inspected includes a part to be detected based on the image using identification devices trained using new learning data that has been generated by the data generation apparatus according to aspects.

According to an aspect, whether or not an object to be inspected includes a part to be detected can be determined with high accuracy by an identification device that has been trained with a smaller calculation amount and time needed for the learning processing, and whose identification accuracy has been improved.

A data generation method according to another aspect of this disclosure includes: a processor (such as a central processing unit (CPU), graphical processing unit (GPU), field programmable gate array (FGPA), etc) configured with a program to perform operations as units of the data generation apparatus, acquiring a result determined by a determination unit, which uses an identification device trained using learning data, as to whether or not an object to be inspected includes a part to be detected based on an image of the object to be inspected; evaluating whether or not the result determined by the determination unit is correct; and generating, if the evaluation unit has evaluated that the determination result is not correct, new learning data by associating at least one of the image and a composite image generated based on the image with information in which the determination result is corrected.

According to an aspect, when the result determined by the determination unit is evaluated to be incorrect, as a result of generating new learning data by associating information in which the determination result is corrected with at least one of the image and a composite image generated based on the image, an image including a feature with respect to which the identification device could not output a desirable identification result can be accumulated as the learning data. Accordingly, an identification device can be trained using an image that the identification device is not good at recognizing, and as a result, the amount of calculation and the calculation time until the result is output can be reduced. Also, the identification accuracy of an identification device can be improved, and the identification accuracy can be continuously improved.

A data generation program according to another aspect of this disclosure causes a computation apparatus (such as a central processing unit (CPU), graphical processing unit (GPU), field programmable gate array (FGPA), etc) included in a data generation apparatus to function as: an acquisition unit configured to acquire a result determined by a determination unit, which uses an identification device trained using learning data, as to whether or not an object to be inspected includes a part to be detected based on an image of the object to be inspected; an evaluation unit configured to evaluate whether or not the result determined by the determination unit is correct; and a generation unit configured to generate, if the evaluation unit has evaluated that the determination result is not correct, new learning data by associating at least one of the image and a composite image generated based on the image with information in which the determination result is corrected.

According to an aspect, when an input indicating that the result determined by the determination unit is incorrect has been received, as a result of generating new learning data by associating information in which the determination result is corrected with at least one of the image and a composite image generated based on the image, an image including a feature with respect to which the identification device could not output a desirable identification result can be accumulated as the learning data. Accordingly, an identification device can be trained using an image that the identification device is not good at recognizing, and as a result, the amount of calculation and the calculation time until the result is output can be reduced. Also, the identification accuracy of an identification device can be improved, and the identification accuracy can be continuously improved.

Provided are a data generation apparatus, data generation method, and a data generation program for accumulating, as learning data, an image that includes a feature on which an identification device could not output a desirable identification result.

DETAILED DESCRIPTION

Hereinafter, an embodiment according to an aspect (hereinafter, referred to as "an embodiment") will be described based on the drawings. Note that constituent elements having the same or similar configurations are denoted by the same reference signs.

1. Application Example

Figure 1:
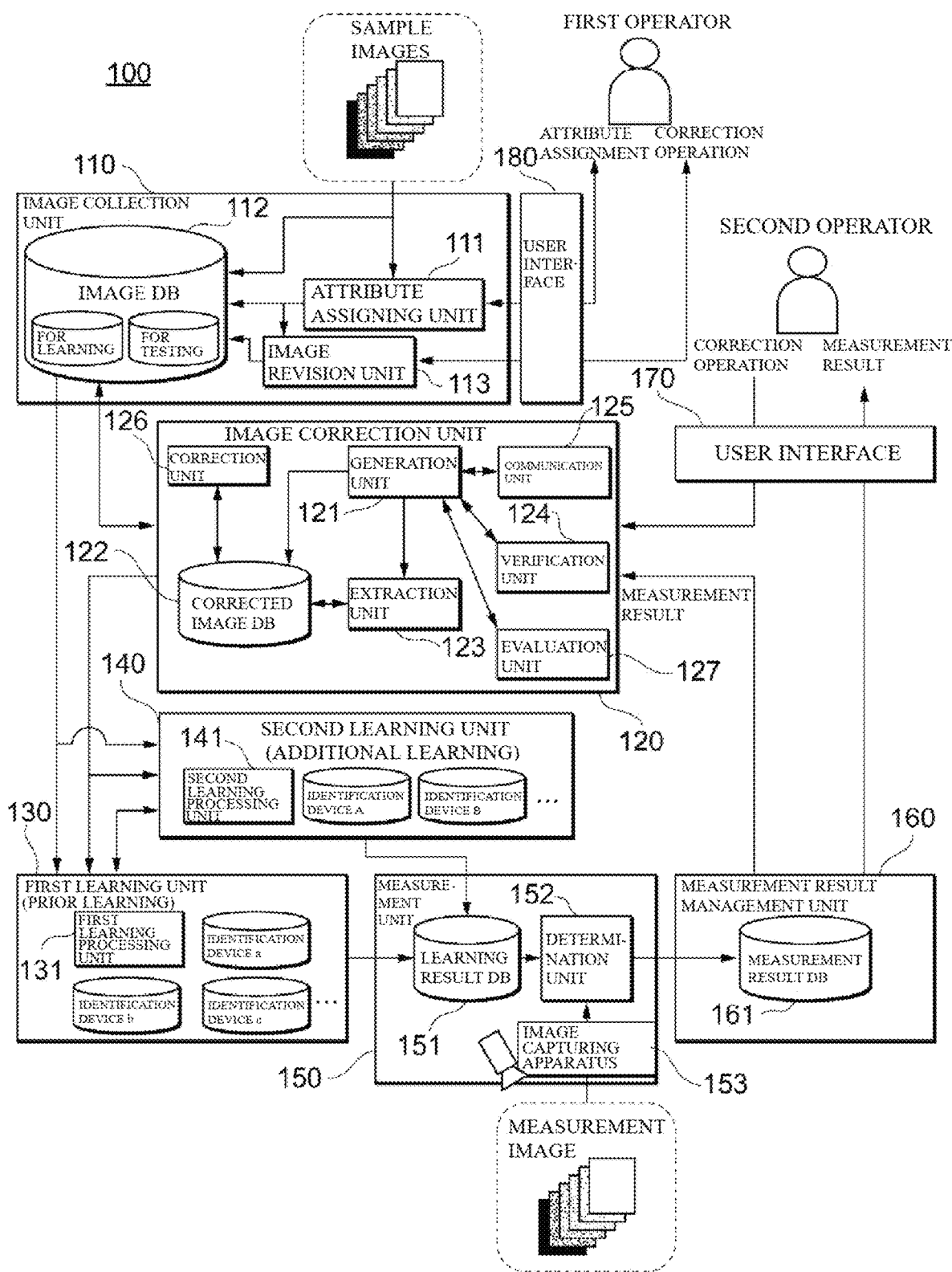
FIG. 1 is a functional block diagram illustrating a data generation apparatus according to an embodiment.

First, an example of a situation in which an aspect is applied will be described using FIG. 1. FIG. 1 is a functional block diagram schematically illustrating an example of a situation to which a data generation apparatus 100 according to an embodiment is applied. The data generation apparatus 100 according to an embodiment includes identification devices (a, b, c, A, B, . . . ) using a neural network such as a convolutional neural network (hereinafter referred to as "CNN"), for example. The identification devices (a, b, c, A, B, . . . ) are identification devices that are generated by machine learning using learning data that includes at least images of objects to be inspected and information (labels) indicating whether or not a part to be detected is included in the images, and can output information indicating whether or not a part to be detected is included in the input image. The data generation apparatus 100 is an apparatus that determines, using the identification devices (a, b, c, A, B, . . . ), whether or not an object to be inspected includes the part to be detected based on the image of the object to be inspected, accepts an input regarding whether or not the determination result is correct with a user interface 170, evaluates whether or not the determination result is correct based on the input with an evaluation unit 127, and if the determination result is evaluated to be not correct, generates new learning data by associating the image of the object to be inspected or a composite image generated based on the image of the object to be inspected with information in which the determination result is corrected. Here, the information in which the determination result is corrected may be information regarding a correct determination result, and may be information indicating that the image of the object to be inspected does not include the part to be detected, or information indicating that the image of the object to be inspected includes the part to be detected, for example. Also, the information indicating that a part to be detected is not included may be information indicating that a specific region of the image does not include the part to be detected, and the information indicating that a part to be detected is included may be information indicating that a specific region of the image includes the part to be detected. In an embodiment, a case will be described where the part to be detected is a defective part included in an object to be inspected. However, the part to be detected is not limited to a defective part included in an object to be inspected, and may also be any part included in the object to be inspected.

As shown in FIG. 1, the data generation apparatus 100 includes an image capturing apparatus 153 that acquires an image of an object to be inspected, a determination unit 152 that determines whether or not the object to be inspected includes a defect based on the image using the identification devices (a, b, c, A, B, . . . ) that have been trained using learning data, a user interface 170 that accepts an input indicating whether or not the result determined by the determination unit 152 is correct, and a generation unit 121 that generates new learning data by associating information in which the determination result is corrected with at least one of the image and a composite image generated based on the image when the user interface 170 has accepted an input indicating that the determination result is not correct. Here, the measurement unit 150 is an example of an "acquisition unit" of an embodiment. In this specification, an image of the object to be inspected that is newly captured by the image capturing apparatus 153 is referred to as a "measurement image", and images of the objects to be inspected that are collected in advance for training identification devices (a, b, c, A, B . . . ) are referred to as "sample images". Note that the data generation apparatus 100 need not include the image capturing apparatus 153, and may also acquire a measurement image from an image capturing apparatus that is provided separately. Also, the data generation apparatus 100 need not include the determination unit 152, and may also acquire a determination result from a determination unit that is provided separately. Furthermore, the data generation apparatus 100 need not include the measurement unit 150. When a measurement image or a determination result is to be acquired from an image capturing apparatus or a determination unit that is provided separately, the data generation apparatus 100 may also acquire the measurement image or the determination result via a communication network such as the Internet.

The measurement image of an object to be inspected that has been captured by the image capturing apparatus 153, and the result determined by the determination unit 152 are displayed in the user interface 170 of a second operator. The second operator verifies the determination result made on the measurement image, and inputs whether or not the determination result is correct using the user interface 170. When a plurality of defects are captured on a measurement image, whether or not the determination result is correct may be input for each defect. The evaluation unit 127 evaluates whether or not the result determined by the determination unit 152 is correct based on the input made with the user interface 170. The evaluation unit 127 may also evaluate whether or not the result determined by the determination unit 152 is correct using an identification device that is different from the identification devices (a, b, c, A, B, . . . ).

The generation unit 121 may generate new learning data by adding information indicating whether or not a defect is present, the information being different between (i.e. distinguishing between) a first erroneous determination in which the determination unit 152 determined that an object to be inspected includes a defect, and the evaluation unit 127 has evaluated that the determination result is not correct, and a second erroneous determination in which the determination unit 152 determined that an object to be inspected includes no defect, and the evaluation unit 127 has evaluated that the determination result is not correct. For example, in the case of the first erroneous determination, there are cases where it is not clear based on which feature of an image the identification devices (a, b, c, A, B, . . . ) have determined that an object to be inspected includes a defect, and therefore, new learning data may be generated by extracting a partial image of the image based on which the determination has been made using the extraction unit 123, and associating the image with information indicating that at least the partial image includes no defect, or new learning data may be generated by combining the partial image with another image. Also, in the case of the second erroneous determination, learning data may be generated by associating the image with information indicating that the image includes a defect, or new learning data may be generated by generating a composite image in which a partial image, of the image, that includes a defect is combined with another image, and associating the composite image with information indicating that a defect is included.

Here, the partial image, of an image, based on which the determination has been made includes a portion of the image that exerts a relatively large influence on the determination by the identification device, and can be extracted so as to include a region of the image whose degree of contribution to the result determined by the identification device is a predetermined value or more, if the identification device is constituted by a CNN, for example. If the identification device is constituted by a CNN, for example, the partial image, of an image, based on which the determination has been made may include a region, of the image, at which the values of a feature map of the layer corresponding to the result determined by the identification device are at least a predetermined threshold value or more. The extraction unit 123 extracts a partial image based on which the determination has been made so as to include a region, of the image, whose degree of contribution on the result determined by the determination unit 152 has at least a predetermined value, and as a result, the partial image based on which the determination unit 152 has made the erroneous determination is extracted, new learning data can be generated based on the partial image that includes a feature that is not easily identified by the identification device, and learning data with which the identification accuracy of the identification device is improved can be generated.

Also, in the case of the second erroneous determination, new learning data may be generated by accepting information indicating the region, of an image, that includes an overlooked defect with the user interface 170, and associating the image with the information, or new learning data may be generated by combining the partial image, of an image, that includes an overlooked defect with another image. Here, the information indicating the region, of an image, that includes a defect may be a frame or the like that indicates a region that includes the defect. There are cases where the region, of an image, that includes a defect is designated by an operator that is not accustomed to perform designation. Therefore, learning data may be generated by correcting information indicating the region by expanding at least a portion of an outer edge of the region such that the number of pixels included in the region is increased by a predetermined amount using the correction unit 126, and associating the image with the information indicating the corrected region. When a correction to expand the outer edge of the region is performed, the direction and amount of the correction may be adjusted such that the region does not overlap an edge of the object to be inspected or a logo or the like that is printed on the surface thereof.

In this way, if an input indicating that the result determined by the determination unit is not correct has been received, new learning data is generated by associating information in which the determination result is corrected with at least one of the image and a composite image generated based on the image, and as a result, images that include a feature with respect to which an identification device could not output a desirable identification result can be accumulated as learning data. Accordingly, an identification device can be trained using images that the identification device is not good at recognizing, and as a result, the amount of calculation and the calculation time until the result is output can be reduced. Also, the identification accuracy of an identification device can be improved, and the identification accuracy can be continuously improved.

2. Exemplary Configuration
Functional Configuration

Next, an example of a functional configuration of the data generation apparatus 100 according to an embodiment will be described using FIG. 1. The data generation apparatus 100 includes a function of generating, using learning data, an identification device that determines whether or not an object to be inspected includes a defect, and outputs, if the object to be inspected includes a defect, attribute information (label) that includes a position of the defect and a type of the defect. Here, if the object to be inspected includes a plurality of defects, the attribute information may include the fact that these defects are included, the positions of the plurality of defects, and the types of these defects. Also, the data generation apparatus 100 includes a function of acquiring a measurement image obtained by measuring the object to be inspected, and outputting attribute information of the object to be inspected using the identification device that has been trained using new learning data. Therefore, the data generation apparatus 100 functions as a data generation apparatus or an inspection system that acquires a measurement image of the object to be inspected, and outputs a measurement result, based on the measurement image, including information indicating whether or not the object to be inspected includes a defect.

As shown in FIG. 1, the data generation apparatus 100 includes an image collection unit 110 that generates and stores learning data, an image correction unit 120 that corrects a measured image (measurement image) based on an input indicating whether or not the determination result is correct, a first learning unit 130 and a second learning unit 140 that generate the identification devices that output attribute information including information indicating whether or not the object to be inspected includes a defect (determination result), and, if the object to be inspected includes a defect, a position and a type of the defect, using learning data generated by at least one of the image collection unit 110 and the image correction unit 120, a measurement unit 150 that acquires a measurement image obtained by measuring an object to be inspected, and outputs attribute information of the object to be inspected using identification devices generated by at least one of the first learning unit 130 and the second learning unit 140, and a measurement result management unit 160 that stores a measurement result in which the measurement image is associated with its attribute information. Here, the measurement result includes a measurement image, attribute information of the object to be inspected output from the identification devices, and a result determined by the determination unit 152. Note that the learning data is not limited to single learning data, and may be a data set that includes a set of learning data.

Here, the defect is an anomaly included in the object to be inspected, and may be a scratch, unevenness in the color or the like, contamination, a chip, burring, foreign matter, blurred printing, or printing misalignment, for example.

Also, the attribute information includes at least information indicating whether or not the image includes a defect, and if the image includes a defect, information indicating the position of the defect and information indicating the type of the defect. Note that the attribute information is not limited to information whether or not a defect is included, information indicating the position of a defect, and information indicating the type of a defect, and may also include information indicating the reliability of the information indicating whether or not a defect is included, information indicating the position of a defect, and information indicating the type of the defect that are output from the identification devices.

The data generation apparatus 100 is constituted by one or more information processing apparatuses that include a storage unit (auxiliary storage units 102 and 103 shown in FIG. 4, for example) that stores a software program and data used when the software program is executed, and a computation unit (processor 104, shown in FIG. 4, for example) that calls and executes a software program. That is, the functional blocks, namely the image collection unit 110, the image correction unit 120, the first learning unit 130, the second learning unit 140, the measurement unit 150, and the measurement result management unit 160, are realized by executing a predetermined software program stored in the storage unit such as the auxiliary storage unit 102 or 103 with the hardware processor such as the processor 104. That is, the functions of the image collection unit 110, the image correction unit 120, the first learning unit 130, second learning unit 140, the measurement unit 150, and the measurement result management unit 160 respectively indicate predetermined processing that is realized by a software program being executed by the hardware processor. Also, the image collection unit 110, the image correction unit 120, the first learning unit 130, the second learning unit 140, the measurement unit 150, and the measurement result management unit 160 are each configured as an information processing apparatus separately or together with other functional units. Note that the data generation apparatus 100 may also be configured by a single information processing apparatus. The hardware configuration of the information processing apparatus in an embodiment will be described later.

Configuration of Image Collection Unit

The image collection unit 110 acquires sample images for generating learning data. The sample images may be images obtained by capturing an object to be inspected, or CG images generated using a known image composition technology. Attribute information is assigned to each sample image collected by the image collection unit 110, or to a plurality of the images by the attribute assigning unit 111. That is, the attribute assigning unit 111 obtains learning data by assigning attribute information to the sample images.

In an embodiment, assignment of the attribute information (labeling) is performed by a first operator via a user interface 180. For example, if a sample image includes a defect, the first operator can assign attribute information that includes information indicating that a defect is included and the position of the defect by enclosing the defect with a frame having a predetermined shape, using a display apparatus (such as a liquid crystal display apparatus) and an input apparatus (such as a touch panel, a keyboard, or a mouse) serving as the user interface 180. Also, attribute information including the type of the defect can also be assigned to the sample image using the user interface 180. Note that the method of assigning the attribute information is not specifically limited. For example, attribute information may be automatically assigned to an image using an identification device that has already learned a relationship between images and attribute information to be assigned to the images, or attribute information may be assigned to clusters that are obtained by clustering a plurality of images using a known statistical method.

The images (learning data) to which respective pieces of attribute information have been assigned by the attribute assigning unit 111 are stored in an image database (hereinafter, referred to as "image DB") 112.

The image collection unit 110 includes an image revision unit 113 that extends the learning data in accordance with the number of acquired sample images and the volume of learning data stored in the image DB 112, for example. The image revision unit 113 may extend the sample images based on a revision operation performed by the first operator via the user interface 180. Note that the image revision unit 113 is not an element that is necessarily essential to the image collection unit 110. Also, "extension of learning data" indicates processing of data augmentation for increasing the data set used for learning.

Extension (augmentation) of the learning data may be performed by translating, rotating, changing in color of, enlarging, or reducing the sample image, for example. Note that the image revision unit 113 is not a constituent element that is essential to the image collection unit 110, and may be provided as appropriate according to the amount of necessary learning data required for image measurement processing that is realized using the data generation apparatus 100. Also, the aforementioned augmentation may be realized by an operator him/herself instructing types of processing such as extraction of a partial image or composition (combination) with a background image via any user interface 180. The learning data extended by the image revision unit 113 is stored in the image DB 112.

Here, the background image is an image to be combined with a partial image, and includes an image that is different from a measurement image from which the partial image has been extracted. Note that the background image may also be a measurement image. When a measurement image is used as the background image, the region of the measurement image at which an image is combined can be limited such that a partial image is to be combined with a region other than the region where the extracted partial image was present in the measurement image. The background image may also be generated based on an image other than the measurement image, and may or may not include the same pattern as the measurement image in a region other than the defect. Also, the background image may be any of various types of images such as an image having a uniform background pattern, an image including a hairline-like background pattern, and an image in which text and the like are printed.

The image DB 112 acquires learning data from the attribute assigning unit 111 and the image revision unit 113. The image DB 112 may store the learning data in a state in which it is classified based on the given attribute information. Also, if attribute information has already been given to a sample image acquired by the image collection unit 110, the image DB 112 may acquire and store the sample image without passing it through the attribute assigning unit 111 and the image revision unit 113. Note that, when the image DB 112 stores the learning data, the learning data may be distinguished between learning data for learning processing that is to be used in learning processing for generating a later-described identification device and test data for evaluation processing for evaluating whether or not the generated identification device outputs the desired attribute information. Of course, the learning data may also be stored in the image DB 112 without distinguishing between learning data and test data, and when learning processing is performed, the data set stored in the image DB 112 may be sorted into data for learning and data for testing using any method.

Configuration of First Learning Unit

Figure 2:
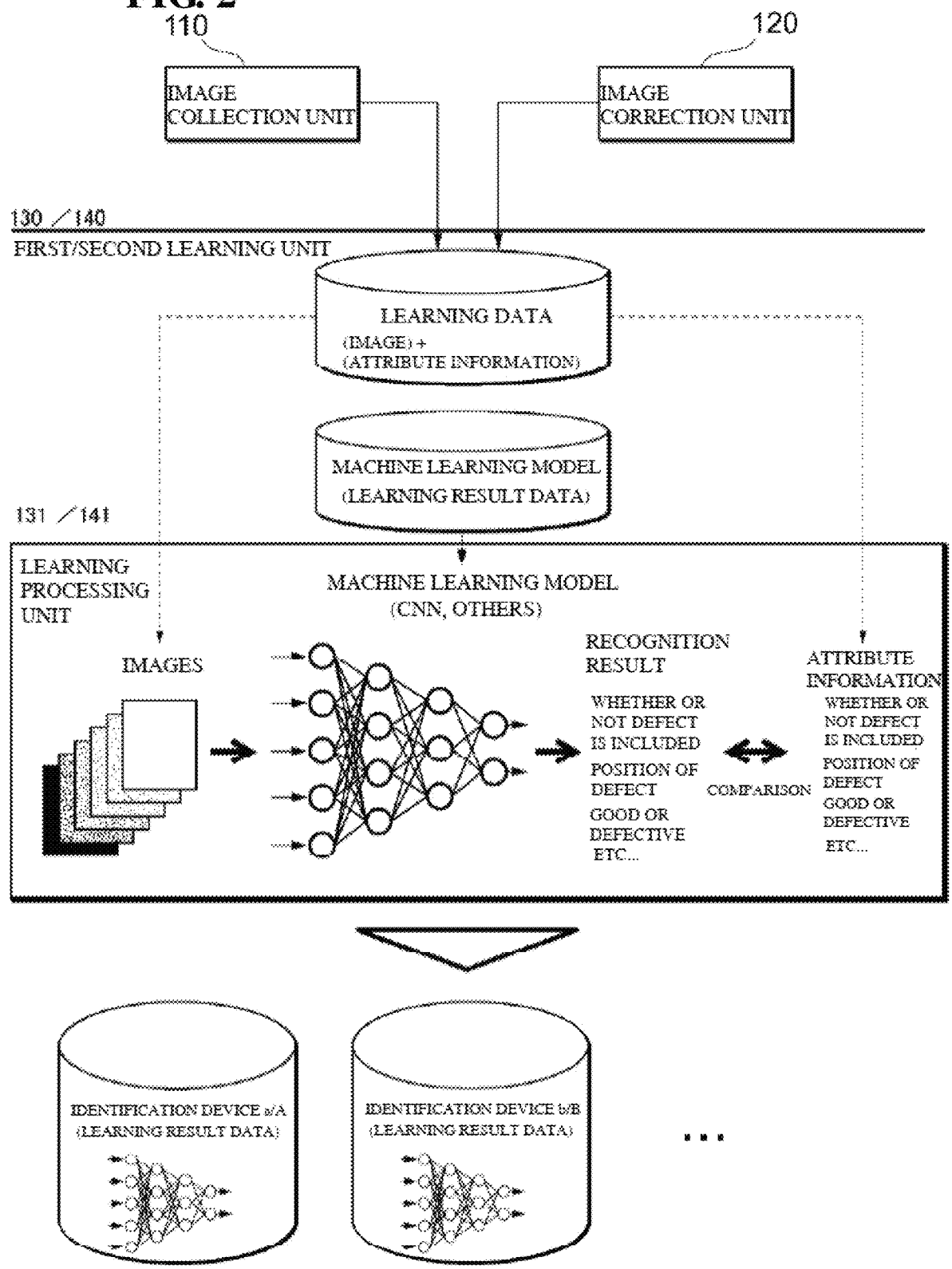
FIG. 2 is a conceptual diagram illustrating processing in a first learning unit and a second learning unit of a data generation apparatus according to an embodiment.

FIG. 2 is a conceptual diagram illustrating the processing in the first learning unit 130 and the second learning unit 140 of the data generation apparatus 100 according to an embodiment. The first learning unit 130 acquires learning data from the image collection unit 110. Note that the first learning unit 130 may also acquire learning data from the later-described image correction unit 120. The first learning unit 130 includes a first learning processing unit 131 that executes machine learning using the acquired learning data and generates identification devices (a, b, c . . . ). The identification devices (a, b, c . . . ) receive image data as input, and output attribute information including information indicating whether or not the image includes a defect, and if one or more defects are included, the position and type of each defect. Note that data other than the image data may be input to the identification devices (a, b, c . . . ). For example, conditions (such as a light amount and an exposure time of the image capturing apparatus) with which an image of the object to be inspected has been captured or identification information of the object to be inspected may be input to the identification devices (a, b, c . . . ).

The identification devices (a, b, c, . . . ) are generated by performing learning processing and evaluation processing with any machine learning model. A machine learning model is a model that includes a predetermined model structure and processing parameters that change according to the learning processing, and whose identification accuracy improves as a result of the processing parameters being optimized based on experience obtained from the learning data. That is, the machine learning model is a model in which optimum processing parameters are learned by learning processing. The algorithm to be used in the machine learning model may be a support vector machine, logistic regression, or a neural network, for example, but the type thereof is not specifically limited. In an embodiment, an example is described in which a convolutional neural network (Convolutional Neural Network) optimized for image recognition is used, which is an example selected from deep neural networks, which are neural networks specifically having three or more layers. Note that the first learning unit 130 may also include a model generation unit (not shown) for generating a machine learning model. Also, the first learning unit 130 may acquire a machine learning model that has been generated in advance from the outside.

The first learning processing unit 131 performs, using the learning data, learning processing for training the machine learning model so as to, when acquired image data is input, output an output value corresponding to the attribute of the measurement image that is expressed by the attribute information. The first learning processing unit 131 further performs, using test data, evaluation processing with the identification devices (a, b, c . . . ) that have been generated by the learning processing in which the outputs of the identification devices (a, b, c . . . ) are compared with attribute information given to the test data. If the outputs of the identification devices (a, b, c . . . ) match the attribute information given to the test data, it is determined that the conditions to generate the identification devices (a, b, c . . . ) are satisfied, and processing for generating the identification devices (a, b, c . . . ) is ended.

The first learning unit 130 outputs information including the model structure and the processing parameters of the generated identification devices (a, b, c . . . ) to the later-described measurement unit 150 and second learning unit 140, as the learning result data.

Next, the identification device will be described. As shown in "machine learning model (CNN, etc.)" in FIG. 2, the data generation apparatus 100 according to an embodiment uses a neural network as the identification device that has learned attributes of measurement images. The neural network used as the identification device may be a neural network having a multi-layered structure that is used in so-called deep learning, and may include an input layer, one or more intermediate layers (hidden layers), and an output layer, in order from the input.

In FIG. 2, the neural network includes two intermediate layers, the output of the input layer is input to a first intermediate layer, the output of the first intermediate layer is input to a second intermediate layer, and the output of the second intermediate layer is input to the output layer. Note that the number of intermediate layers is not limited to two, and the neural network may include three or more layers.

The input layer, the intermediate layers, and the output layer each include one or more neurons. For example, the number of neurons in the input layer can be set according to the number of pixels and primary colors of the measurement image. The numbers of neurons in the intermediate layers can be set as appropriate according to an embodiment. Also, the number of neurons in the output layer can be set according to the number of pieces of attribute information of the object to be inspected.

The neurons in adjacent layers are appropriately linked to teach other, and weights (link-weights) are set to the respective links. In the example shown in FIG. 2, each neuron in one layer is linked to all the neurons in the adjacent layers, but the linkage of neurons is not limited to this example, and may be set as appropriate.

A threshold value is set to each neuron, and basically, the output of each neuron is determined by whether or not the sum of the products of respective inputs and corresponding weights exceeds the threshold value. The output of each neuron may be determined by an arbitrary activation function, and a step function, a Sigmoid function, a hyperbolic function, or a ReLU (Rectified Linear Unit) function may be used, for example. Also, the output of each neuron in the output layer may be determined by an arbitrary output function, and an identity function, a Sigmoid function, or a softmax function may be used, for example. The data generation apparatus 100 outputs the attribute information of the measurement image from the output layer by inputting a measurement image to the input layer of such a neural network.

The first learning processing unit 131 updates the weights of links between the neurons and the threshold values set in the respective neurons such that the value of an objective function for evaluating the difference between the output of the neural network and the teaching data included in the learning data is minimized (or maximized). The configuration (the number of layers in the neural network, the number of neurons in each layer, the linkage relationship between the neurons, activation functions of the respective neurons, for example) of a trained neural network generated in this way, the weights of the respective links between the neurons, information indicating the threshold values of the respective neurons are stored in the learning result DB 151. The data generation apparatus 100 performs setting of the neural network to be used in processing for identifying a desired object to be inspected by referring to the learning result DB 151.

Configuration of Second Learning Unit

Next, the processing to be performed by the second learning unit 140 will be described using FIG. 2. The second learning unit 140 performs additional training (relearning) on an identification device that has been generated by predetermined generation processing. Note that constituent elements of the second learning unit 140 that are the same as those of the first learning unit 130 will not be described.

The second learning unit 140 acquires the learning result data of the identification devices (a, b, c . . . ) that have been generated and trained by the first learning unit 130. Note that the second learning unit 140 may acquire learning result data relating to an identification device that has been generated by predetermined generation processing from the outside. The second learning unit 140 acquires learning data from the image collection unit 110. Note that the second learning unit 140 may also acquire the learning data from the later-described image correction unit 120.

The second learning unit 140 includes a second learning processing unit 141 that executes additional training (re-learning) by machine learning using learning data, and generates identification devices (A, B, C . . . ). The identification devices (A, B, C . . . ) are generated by performing learning processing and evaluation processing with the identification devices (a, b, c . . . ) that have been generated by the predetermined learning processing. In other words, the second learning processing unit 141 generates the identification devices (A, B, C . . . ) by executing, using learning data, learning processing and evaluation processing with the learning result data including the model structure and the processing parameters of the identification devices (a, b, c . . . ). The identification devices (A, B, C . . . ) receive image data as input and output attribute information including information indicating whether or not the image includes a defect, and if one or more defects are included, the position and type of each defect.

The second learning processing unit 141 performs, using learning data, learning processing (learning processing for additional training) for training a machine learning model expressed by the learning result data of the identification devices (a, b, c . . . ) such that, when acquired image data is input, an output value corresponding to an attribute of the measurement image that is expressed by the attribute information is output. Here, the learning processing of additional training performed by the second learning processing unit 141 may be performed using learning data acquired by the later-described image correction unit 120. With this, learning data that has been newly generated based on an image obtained by capturing an object to be inspected can be used, and the identification accuracy of the identification device can be improved.

The second learning processing unit 141 further subjects the identification devices (A, B, C . . . ) that have been generated by the learning processing to evaluation processing in which, using test data, the outputs of the identification devices (A, B, C . . . ) are compared with attribute information given to the test data. When the outputs of the identification devices (A, B, C . . . ) match the attribute information given to the test data, it is determined that the conditions for generating the identification devices (A, B, C . . . ) are satisfied, and the processing for generating the identification devices (A, B, C . . . ) is ended. Here, the evaluation processing performed by the second learning processing unit 141 may be performed using test data acquired from the later-described image correction unit 120. With this, evaluation can be performed using learning data that has been newly generated based on an image obtained by capturing the object to be inspected, and the recognition accuracy of the identification devices can be improved.

The second learning unit 140 outputs information including the model structure and the processing parameters of the identification devices (A, B, C . . . ) to the later-described measurement unit 150, as learning result data.

Note that it is also possible that the first learning unit 130 and the second learning unit 140 are configured integrally, and the first learning processing unit 131 executes the learning processing and the evaluation processing of the additional training.

Configuration of Measurement Unit

Figure 3:
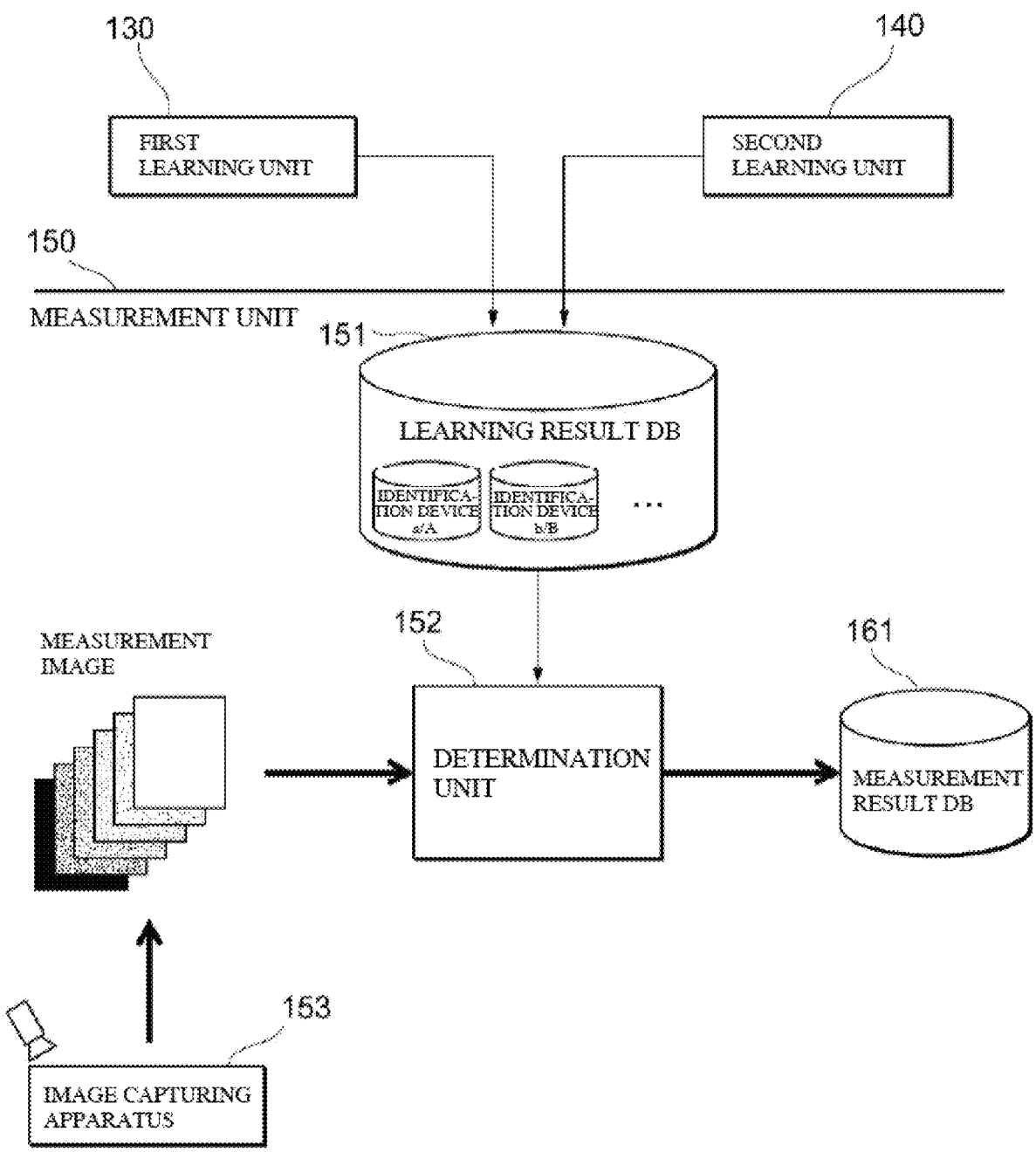
FIG. 3 is a conceptual diagram illustrating processing in a measurement unit of a data generation apparatus according to an embodiment.

FIG. 3 is a conceptual diagram illustrating the processing to be performed in the measurement unit 150 of the data generation apparatus 100 according to an embodiment. The measurement unit 150 causes the identification devices that have been generated through the learning processing and the evaluation processing using learning data to output attribute information of a measurement image of the object to be inspected captured by the image capturing apparatus 153, determines whether or not the object to be inspected includes a defect using the determination unit 152, and outputs attribute information including information (determination result) indicating whether or not a defect is included, and a measurement result including the measurement image. The attribute information includes information (determination result) indicating whether or not a defect is included, and if one or more defects are included, the position and the type of each defect.

The measurement unit 150 acquires, from the first learning unit 130 and the second learning unit 140, information including the model structures and the processing parameters of the identification devices, as the learning result data. The measurement unit 150 includes a learning result DB 151 that stores acquired learning result data. Also, the measurement unit 150 includes the image capturing apparatus 153 that captures the object to be inspected. The image capturing apparatus 153 may be installed so as to capture a production line of a factory, and may constitute a portion of the production line, for example. The image capturing apparatus 153 may capture images, as measurement images, of components and products (hereinafter, components and products may be collectively referred to as "workpieces") serving as objects to be inspected that flow (are transported) in the production line.

The measurement unit 150 includes the determination unit 152 that outputs attribute information of the measurement image using an identification device that is configured based on the learning result data stored in the learning result DB 151. The determination unit 152 determines whether or not the measurement image captured by the image capturing apparatus 153 includes a defect using the identification devices (a, b, c, A, B, . . . ) that have been trained using the learning data.

The measurement unit 150 outputs, to the measurement result management unit 160, measurement results that include the measurement image, and the attribute information of the measurement image that includes at least the determination result of the measurement image that is output by the determination unit 152 using the identification device. Note that the measurement unit 150 may also output identification information for identifying individual objects to be inspected to the measurement result management unit 160 along with the measurement results. Here, the identification information of the object to be inspected may be acquired from the measurement image, or may be acquired from the outside via a predetermined interface. A production number or a figure obtained by coding the production number may also be used as the identification information, for example. Therefore, the identification information is preferably information with which objects to be inspected can be individually identified. Note that the measurement unit 150 may also output the measurement result for an object to be inspected to a unit other than the measurement result management unit 160. For example, the measurement unit 150 may output the measurement results and the identification information to the later-described user interface 170. Alternatively, the measurement unit 150 may also directly or indirectly output the measurement results to a sorting apparatus (not shown), for example. The sorting apparatus sorts the object to be inspected based on the acquired measurement result.

Note that the data generation apparatus 100 need not include the measurement unit 150. For example, capturing of a measurement image and determination made by the determination unit 152 need not be performed by the data generation apparatus 100, and may be performed by a measurement apparatus that is provided separately from the data generation apparatus 100. In this case, the measurement apparatus provided separately from the data generation apparatus 100 may be used by an operator that operates the data generation apparatus 100. Also, the measurement apparatus that is provided separately from the data generation apparatus 100 may be used by an operator that is different from the operator that operates the data generation apparatus 100, and the data generation apparatus 100 may acquire the measurement image captured by the measurement apparatus and the result determined by the determination unit 152 via a communication network such as the Internet.

Configuration of Measurement Result Management Unit

The measurement result management unit 160 includes a measurement result DB 161 that stores a measurement image included in a measurement result, and the attribute information of the measurement image that includes at least a determination result of the measurement image that the determination unit 152 outputs using the identification device, in association with each other. Note that the measurement result management unit 160 may also acquire identification information for identifying the object to be inspected along with the measurement result. Here, the identification information of the object to be inspected may be acquired from the measurement unit 150, or may also be acquired from the outside via a predetermined interface. Alternatively, the measurement result DB 161 classifies and stores the measurement images according to the type of attribute included in the attribute information, for example, in association with the attribute of the type of defect.

The measurement result management unit 160 outputs the measurement results to the user interface 170. Here, the measurement result management unit 160 may also output the identification information of the object to be inspected to the user interface 170. The measurement result management unit 160 outputs the measurement results also to the later-described image correction unit 120. Here, the measurement result management unit 160 may also output the identification information of the object to be inspected to the image correction unit 120.

User Interface

In an embodiment, the user interface 170 is used by the second operator to confirm the result determined by the determination unit 152, to confirm the attribute information of the measurement image, to designate a partial image that includes a defect included in the measurement image, to accept information indicating whether or not the result determined by the determination unit 152 is correct, to designate the correction method to be used in the correction unit 126, and to designate the method that the generation unit 121 will use to generate a composite image. The user interface 170 at least includes a display unit (such as a liquid crystal display apparatus) for displaying a measurement image and a measurement result of the measurement unit 150, and an input unit (such as a touch panel, a keyboard, or a mouse) for allowing the second operator to designate a partial image, to input whether or not the result determined by the determination unit 152 is correct, and to designate the correction method and the generation method and the like. The second operator may determine whether or not the measurement result is correct based on the measurement image displayed in the display unit, and the measurement result of the measurement image, and input information indicating whether or not the measurement result is correct and a region of the partial image including a defect, using the input unit. Also, the second operator may also designate, using the input unit, how the partial image will be combined with another image based on the measurement image displayed in the display unit, and the measurement result of the measurement image.

Configuration of Image Correction Unit

The image correction unit 120 generates learning data by associating the acquired measurement image with the information in which the determination result is corrected. The image correction unit 120 includes the generation unit 121, a corrected image database (hereinafter referred to as a "corrected image DB") 122, the extraction unit 123, a verification unit 124, a communication unit 125, the correction unit 126, and the evaluation unit 127. When the evaluation unit 127 has evaluated that the identification result is not correct, the image correction unit 120 generates learning data by associating at least one of the image and a composite image generated based on the image with information in which the determination result is corrected. Note that, in the following, an example in which the image correction unit 120 generates new learning data based on the measurement image will be described, but new learning data may also be generated based on a sample image.

When the evaluation unit 127 has evaluated that the result determined by the determination unit 152 is not correct, the generation unit 121 generates new learning data by associating at least one of the image and a composite image generated based on the image with the information in which the determination result is corrected. The generation unit 121 may generate new learning data by adding information, indicating whether or not a defect is included, that is different between the case of the first erroneous determination in which the determination unit 152 has determined that the object to be inspected includes a defect, and the evaluation unit 127 has evaluated that the determination result is not correct, and the case of the second erroneous determination in which the determination unit 152 has determined that the object to be inspected includes no defect, and the evaluation unit 127 has evaluated that the determination result is not correct. As a result of generating new learning data by adding information indicating whether or not a defect is included that is different between the case of first erroneous determination, that is, the case of a false positive in which a defect has been erroneously detected, and the case of second erroneous determination, that is, the case of a false negative in which a defect has been overlooked, learning data can be appropriately generated using processing appropriate for reducing the first erroneous determination and processing appropriate for reducing the second erroneous determination, and learning data can be generated with which the identification accuracy of an identification device can be efficiently improved.

The generation unit 121 may generate a learning data set by mixing new learning data generated in the case of the first erroneous determination and new learning data generated in the case of the second erroneous determination, and store the learning data set in the corrected image DB 122. In this case, the generation unit 121 may generate the learning data set by randomly mixing the new learning data generated in the case of the first erroneous determination and the new learning data generated in the case of the second erroneous determination. As a result of mixing the learning data appropriate for reducing the first erroneous determination and the learning data appropriate for reducing the second erroneous determination, a learning data set with which both types of erroneous determination can be reduced can be generated, and a learning data set with which the identification accuracy of the identification device can be efficiently improved can be generated.

The corrected image DB 122 stores new learning data generated by the generation unit 121. The corrected image DB 122 may temporarily store the measurement images, inputs made with the user interface 170, and results of evaluation performed by the evaluation unit 127, or may temporarily store sample images, inputs made with the user interface 180, and results of evaluation performed by the evaluation unit 127.

The extraction unit 123 extracts a partial image of the image based on which the determination has been made. The partial image of the image based on which the determination has been made may include a portion of the image that has exerted a relatively large influence on the identification made by the identification device, and if the identification device is constituted by a CNN, the partial image based on which the determination has been made may be generated based on the position information and the degree of contribution of a partial image that greatly influences the determination result. For example, the partial image may be generated by indicating which part of the image the identification device has focused on in order to perform the identification using a CAM (Class Activation Map), which is a known method. In the case of the first erroneous determination in which the determination unit 152 determined that the object to be inspected includes a defect, and the evaluation unit 127 has evaluated that the determination result is not correct, the generation unit 121 may generate new learning data by associating the image with information at least indicating that the partial image of the image based on which the determination has been made includes no defect. Accordingly, in the case of the first erroneous determination, as a result of associating the image with information indicating that the partial image of the image based on which the determination has been made includes no defect, the portion of the image based on which the identification device erroneously determined that a defect is included can be specified, and can be shown to include no defect, and even if it is not clear why the identification device has erroneously detected a defect, learning data with which the identification accuracy of the identification device can be improved can be generated.

Also, in the case of the first erroneous determination, the generation unit 121 may generate a composite image by combining a partial image of the image based on which the determination has been made and an image that is different from the image including the partial image, and generate new learning data by associating the composite image with information indicating that no defect is included. Here, a composite image generated by combining a partial image with another image may be generated using a known combining method, and may be generated using a Poisson image editing method, for example. When a composite image is generated, the user interface 170 may accept an input of the generation method to be used to generate the composite image, the input including designation of the image with which a partial image is to be combined, and designation of the position in the image at which the partial image is to be combined. As a result of generating a composite image, in the case of the first erroneous determination, combining the partial image based on which the determination unit 152 has determined that a defect is included with an image that is different from the image from which the partial image has been extracted can increase the variation of images that do not actually include a defect, but will be erroneously determined by the determination unit 152 that a defect is included, and makes it possible to generate learning data with which the number of erroneous determinations can be reduced by generating images similar to the image that has been erroneously determined that a defect is included. With this, various composite images with which erroneous determination may be made are generated from one image subject to an erroneous determination, and learning data with which the identification accuracy of an identification device can be improved so that whether or not the object to be inspected includes a defect can be identified with higher accuracy can be generated.

In the case of the second erroneous determination in which the determination unit 152 determined that no defect is included in the object to be inspected, and the evaluation unit 127 has determined that the determination result is not correct, the generation unit 121 may generate new learning data by associating the image with information indicating at least that a defect is included in the image. The information indicating that a defect is included in the image may be information indicating the fact that a defect is included in the image, or information indicating that a defect is included in a specific part of the image. In the case of the second erroneous determination, as a result of associating the image with information indicating that a defect is included in the image, an image with respect to which the identification device has erroneously determined that no defect is included in the image can be specified, and learning data can be generated with which the identification accuracy of an identification device can be improved.

When the second erroneous determination occurs, designation of a region, of the image, that includes a defect may be accepted with the user interface 170. That is, the information indicating that a defect is included may include information indicating the region, of the image, that includes a defect.

When the second erroneous determination occurs, the correction unit 126 corrects the information indicating the region by expanding at least a portion of the outer edge of the region such that the number of pixels included in the region is increased by a predetermined amount. The correction unit 126 makes a correction by which, by expanding at least a portion of the outer edge of the region, the number of pixels indicating a normal part inside the region is increased. The correction unit 126 may also acquire a plurality of regions of the image from the user interface 170, and make a correction, with respect to each region, by expanding at least a portion of the outer edge of those regions. The regions may be corrected such that a region that has been designated as surrounding a defect is enlarged in every direction by one or a predetermined number of pixels. The correction unit 126 may correct the region such that at least a portion of the outer edge of the region is shrunk, if a predetermined condition is satisfied. For example, if the region including a defect that has been designated by the second operator includes, in a first portion, a pattern that is not a defect, then the region may be corrected such that the outer edge of the acquired region is shrunk in the first portion. Here, the region may also be corrected such that one or more of the outer edges of the acquired region are expanded in a portion other than the first portion. Also, for example, if the second operator designates the region including a defect such that the area of a portion other than the defect is larger than that of the defect, the correction unit 126 may correct the region such that the outer edge of the designated region is shrunk. In this case, the predetermined condition may also be a condition relating to the percentage of a portion other than the defect in the region. The predetermined condition may be a condition that the percentage of a portion other than the defect in the region is at least a threshold value, for example. In the case of the second erroneous determination, the position of a defect is specified by information indicating the region, of the image, that includes the defect, the region is corrected such that at least a portion of the outer edge of the region is expanded, and then, the image is associated with information indicating the region. With this, even if a region including a defect is designated as including almost only the defect (or defects), then the region is corrected such that at least a portion of an outer edge of the region is expanded, and learning data can be generated with which an identification device can be trained so as to appropriately identify a feature of a defect included in the object to be inspected based on an image. As a result, the accuracy of the identification device for identifying a defect that has been trained using the learning data can be improved. Note that the predetermined condition may also be a condition relating to the number of pixels in the region acquired with the user interface 170, or a condition relating to the ratio of the number of pixels in the region acquired with the user interface 170 relative to the number of pixels in the entire measurement image.

In the case of the second erroneous determination, the generation unit 121 may generate a composite image by combining a partial image, of the image, that includes a defect and an image that is different from the image including the partial image, and generate new learning data by associating the composite image with information indicating that a defect is included. The partial image including a defect may be extracted based on a region, of the image, including a defect that is designated with the user interface 170. Also, the user interface 170 may accept input of the generation method to be used to generate the composite image, the input including designation of an image with which a partial image is combined, and designation of position in the image at which the partial image is combined. As a result of generating a composite image, in the case of the second erroneous determination, by combining a partial image including a defect with an image that is different from the image including the partial image, the variation of images that actually include a defect, but will be erroneously determined by the determination unit 152 that no defect is included can be increased, and learning data with which the number of erroneous determinations can be reduced can be generated by generating images similar to the image that has been erroneously determined that no defect is included. With this, various composite images with which erroneous determination may be made are generated from one image subject to an erroneous determination, and learning data with which the identification accuracy of an identification device can be improved so that whether or not the object to be inspected includes a defect can be identified with higher accuracy can be generated.

The verification unit 124 may verify whether or not the determination result is the first erroneous determination or the second erroneous determination by causing the determination unit 152 to determine whether or not a composite image includes a defect. Here, the verification unit 124 preferably uses an identification device that is the same as the identification device that has determined whether or not the image includes a defect to determine whether or not the composite image includes a defect. With this, it can be verified if a composite image has been generated with which a determination result can be obtained that is similar to the determination result obtained for the original image that does not actually include a defect, but with which the determination unit 152 erroneously determines that a defect is included. Also, it can be verified if a composite image has been generated with which a determination result can be obtained that is similar to the determination result obtained for the original image that actually include a defect, but with which the determination unit 152 erroneously determines that no defect is included. With this, it can be verified if a composite image has been generated with which a determination result can be obtained that is similar to the determination result obtained for the original image that incurs the first erroneous determination or the second erroneous determination, and it can be confirmed that the generated composite image is useful for reducing the number of erroneous determinations. Note that a "similar determination result" is, for example, a determination result that is obtained when, if the first erroneous determination has been made with the original image, the first erroneous determination is also made with the composite image, and if the second erroneous determination has been made with the original image, the second erroneous determination is also made with the composite image.

When new learning data is to be generated by the generation unit 121, the communication unit 125 may inquire of an authorized person whether or not the new learning data should be registered, while notifying the authorized person of information indicating which of the first erroneous determination and the second erroneous determination has been made. Here, the authorized person is a person having the authority to correct the determination made by the second operator, and is a person having the authority to manage the generation of the learning data. As a result of inquiring of the authorized person whether or not the new learning data is to be registered when new learning data is generated, the new learning data is prevented from being easily registered while notifying the authorized person of the type of erroneous determination, and learning data having an appropriate content can be accumulated. Note that the communication unit 125 may be connected to the user interfaces (170 and 180), and may output information to a device external to the data generation apparatus 100 by wire or wirelessly.

The evaluation unit 127 may evaluate whether or not the result determined by the determination unit 152 is correct, based on an input indicating whether or not the result determined by the determination unit 152 is correct that has been input with the user interface 170. The evaluation unit 127 may make the same evaluation as that of the input indicating whether or not the result determined by the determination unit 152 is correct that has been input with the user interface 170, or may make a different evaluation. The evaluation unit 127 may also evaluate whether or not the result determined by the determination unit 152 is correct using an identification device that is different from the identification devices (a, b, c, A, B, . . . ).

Hardware Configuration

Figure 4:
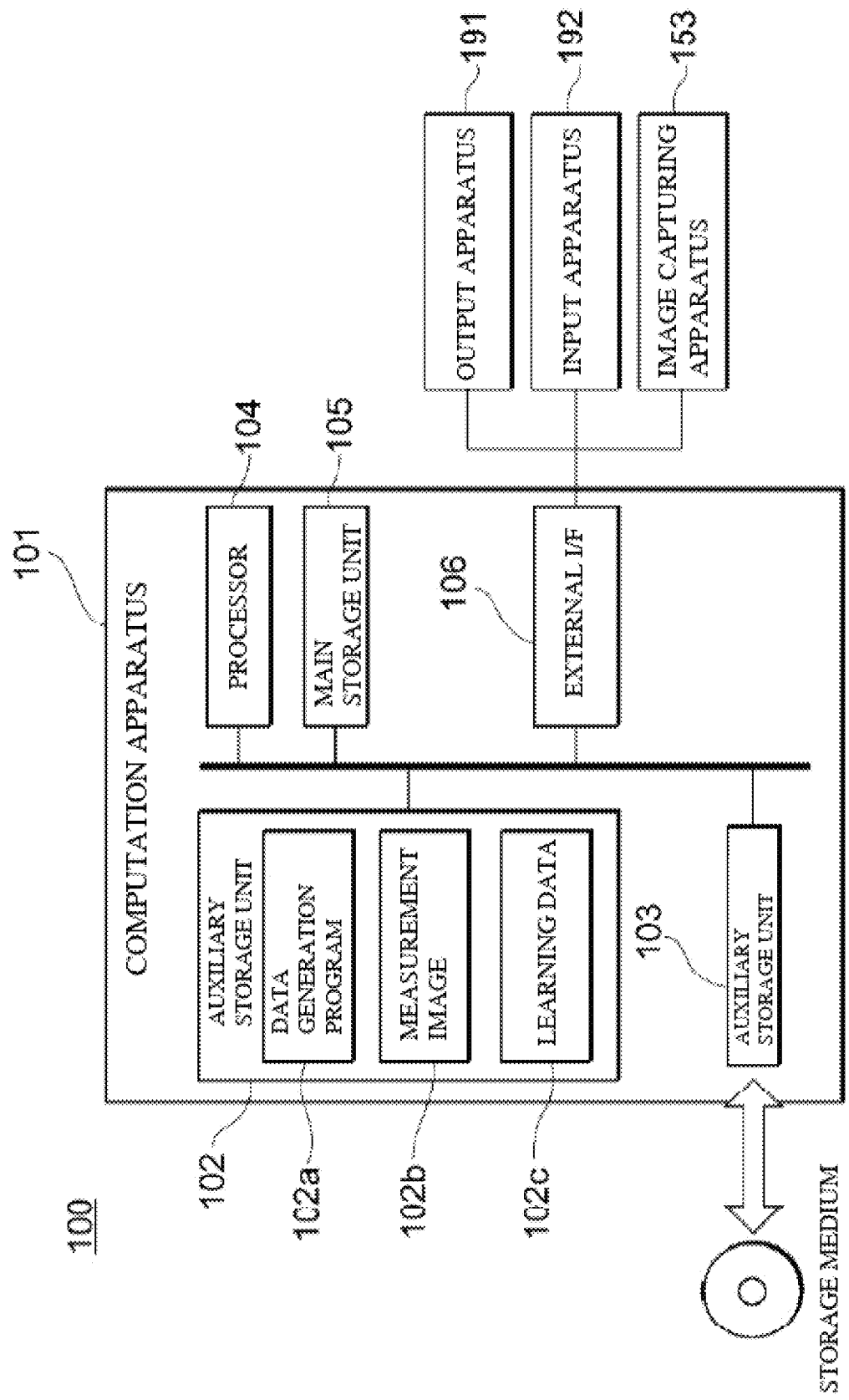
FIG. 4 is a block diagram illustrating a hardware configuration of a data generation apparatus according to an embodiment.
Figure 5:
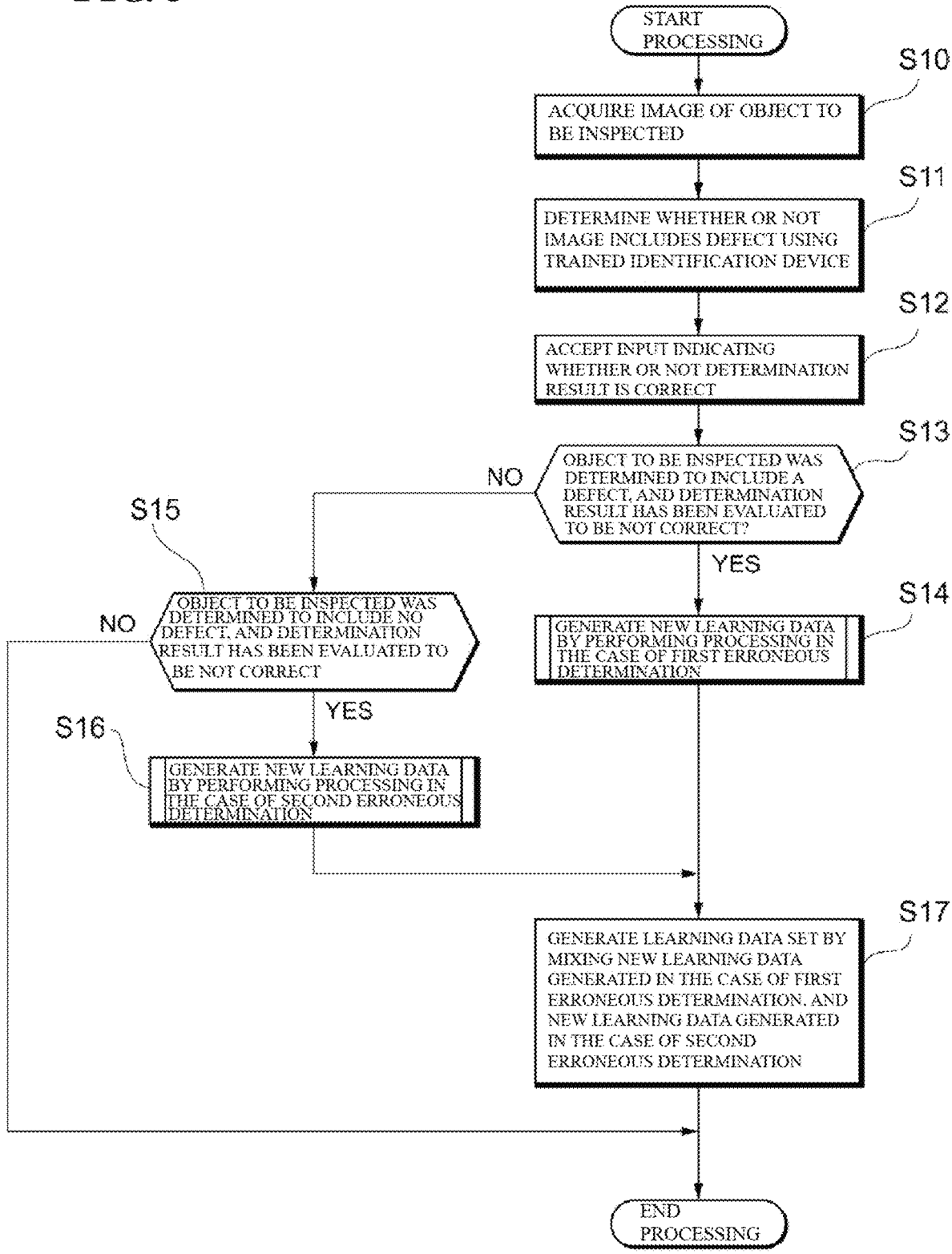
FIG. 5 is a flowchart illustrating first processing to be executed by a data generation apparatus according to an embodiment.

Next, an example of the hardware configuration of the data generation apparatus 100 according to an embodiment will be described using FIG. 4. The data generation apparatus 100 according to an embodiment may include a computation apparatus 101, an output apparatus 191, an input apparatus 192, and the image capturing apparatus 153. Here, the output apparatus 191 and the input apparatus 192 constitute the user interface 170 and the user interface 180.

The computation apparatus 101 may also include the auxiliary storage units 102 and 103, the processor 104, a main storage unit 105, and an external interface (hereinafter, referred to as an "external I/F").

The computation apparatus 101 includes a CPU (Central Processing Unit), a RAM (Random Access Memory), a ROM (Read Only Memory), and the like, and controls the constituent elements according to information processing. The processor 104 may include a CPU, and the auxiliary storage units 102 and 103 and the main storage unit 105 may each include a RAM and a ROM. The auxiliary storage unit 102 may be a hard disk drive, a solid-state drive, or the like, and may store a data generation program 102a to be executed by the processor 104, a measurement image 102b captured by the image capturing apparatus 153, learning data 102c, and the like. The auxiliary storage unit 103 and the main storage unit 105 may be a hard disk drive, or a solid-state drive, for example, similarly to the auxiliary storage unit 102. The data generation program 102a is a program for performing processing to realize the functions of the image collection unit 110, the image correction unit 120, the first learning unit 130, the second learning unit 140, the measurement unit 150, and the measurement result management unit 160, that have been described above, and as a result of the program being executed by the processor 104, the functions are realized. Note that the data generation program 102a may also be a program for performing processing to realize some functions of the image collection unit 110, the image correction unit 120, the first learning unit 130, the second learning unit 140, the measurement unit 150, and the measurement result management unit 160, or may also include a program for performing processing for realizing other functions.

The external I/F 106 is a USB (Universal Serial Bus) port or the like, and is an interface for connecting to external apparatuses such as the output apparatus 191, the input apparatus 192, and the image capturing apparatus 153. Note that the data generation apparatus may also include an interface for performing wired or wireless communication via a network, such as a wired LAN (Local Area Network) module or a wireless LAN module.

A storage medium is a medium that stores information such as programs and the like via an electrical, magnetic, optical, mechanical or chemical effect such that the stored information such as programs can be read by an apparatus such as a computer. The storage medium may be a CD (Compact Disk) or a DVD (Digital Versatile Disk), for example, and may store the data generation program 102a. The data generation program 102a stored in the storage medium is copied to the auxiliary storage unit 103, and may also be copied to the auxiliary storage unit 102 and the main storage unit 105. In FIG. 4, a disk-type storage medium such as a CD or a DVD is illustrated as an example of the storage medium. However, the type of the storage medium is not limited to the disk type, and may be a type other than the disk type. A semiconductor memory such as a flash memory can be given as an example of a storage medium other than a disk-type storage medium. Also, the data generation apparatus 100 may acquire data such as the data generation program 102a using wired or wireless communication via a network.

Note that, in relation to the specific hardware configuration of the data generation apparatus 100, constituent elements can be omitted, substituted and added as appropriate depending on an embodiment. For example, the computation apparatus 101 may include a plurality of processors, or may include a GPU (Graphical Processing Unit) or an FPGA (Field Programmable Gate Array). Also, the data generation apparatus 100 may also be constituted by a plurality of information processing apparatuses. The data generation apparatus 100 may be constituted also by, other than an information processing apparatus designed only for the service that is provided, a general-purpose desk top PC (Personal Computer), a tablet PC, or the like.

3. Exemplary Operation

Figure 6:
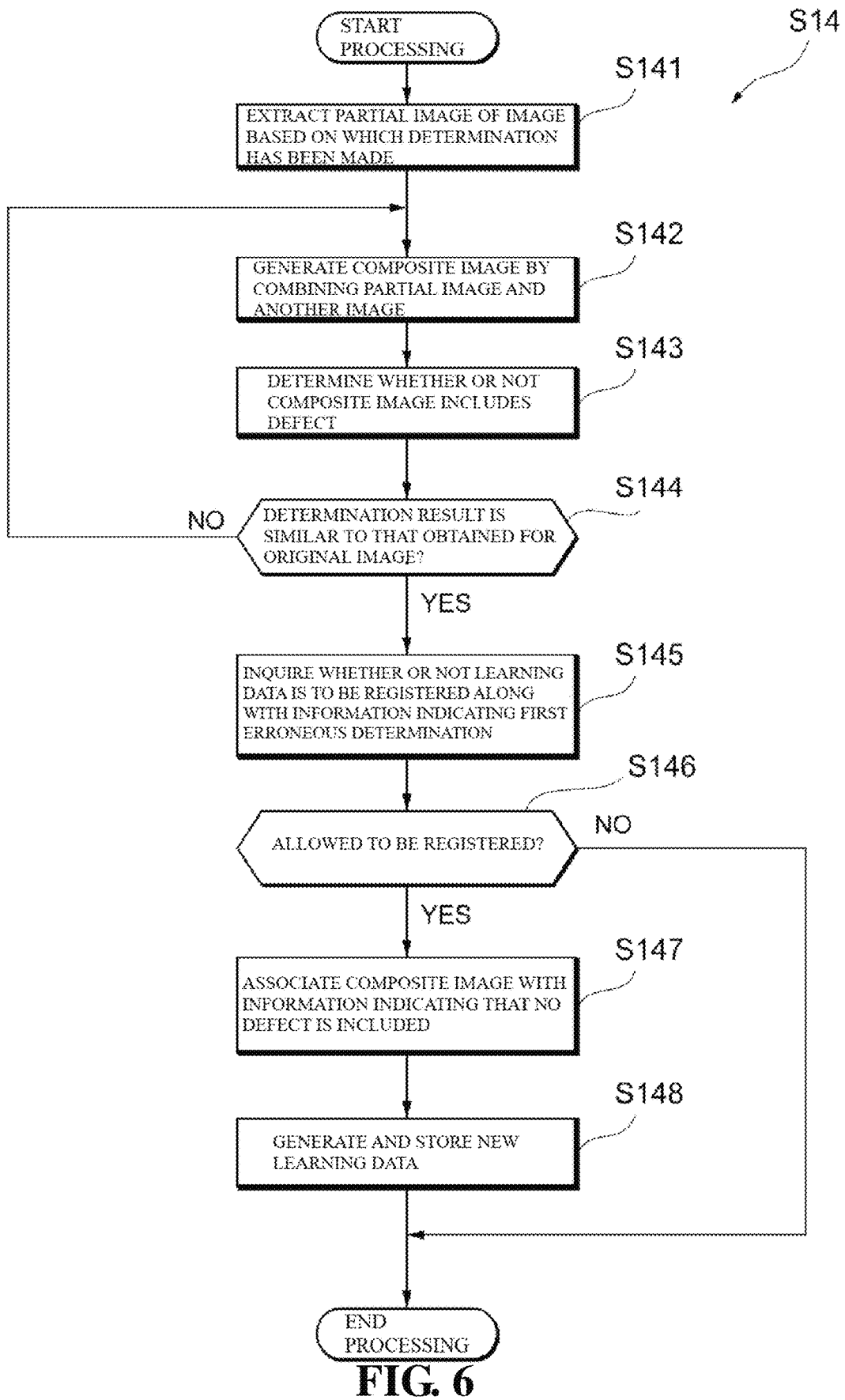
FIG. 6 is a flowchart illustrating processing to be executed by a data generation apparatus according to an embodiment in the case of first erroneous determination.

FIG. 6 is a flowchart illustrating first processing to be executed by the data generation apparatus 100 according to an embodiment. The first processing is processing in which, when the determination result is the first erroneous determination or the second erroneous determination, new learning data is generated by performing processing corresponding to the type of the erroneous determination, and a learning data set is generated by mixing the new learning data generated in the case of the first erroneous determination, and the new learning data generated in the case of the second erroneous determination.

The data generation apparatus 100 acquires a measurement image of the object to be inspected (S10), and determines whether or not the measurement image includes a defect using an identification device trained by the first learning unit 130 and the second learning unit 140 (S11). Then, the data generation apparatus 100 displays the determination result in the user interface 170, and accepts an input indicating whether or not the determination result is correct (S12). The data generation apparatus 100 evaluates whether or not the determination result is correct based on the accepted input.

In the case of the first erroneous determination in which the object to be inspected has been determined to include a defect, and the determination result has been evaluated to be not correct (S13: YES), the data generation apparatus 100 generates new learning data by performing processing that is performed in the case of the first erroneous determination that will be described in detail using FIG. 6 (S14).

On the other hand, if the first erroneous determination has not been made (S13: NO), and in the case of the second erroneous determination in which the object to be inspected was determined to include no defect, and the determination result has been evaluated to be not correct (S15: YES), the data generation apparatus 100 generates new learning data by performing processing that is performed in the case of the second erroneous determination that will be described in detail using FIG. 7 (S16). Note that, if the first erroneous determination has not been made (S13: NO), and the second erroneous determination has not been made (S15: NO), the first processing is ended.

After generating new learning data, the data generation apparatus 100 generates a learning data set by mixing the new learning data generated in the case of the first erroneous determination, and the new learning data generated in the case of the second erroneous determination, and stores the learning data set in the corrected image DB 122 (S17). Then, the first processing is ended.

FIG. 6 is a flowchart illustrating processing to be executed by the data generation apparatus 100 according to an embodiment in the case of the first erroneous determination. When the first erroneous determination is made, the data generation apparatus 100 extracts a partial image of the image based on which the determination has been made (S141). The partial image may be extracted using a CAM.

The data generation apparatus 100 accepts an input that designates the image with which a partial image is to be combined, and designation of the position in the image at which the partial image is to be combined with the user interface 170, and generates a composite image by combining the partial image and another image (S142). Then, the verification unit 124 causes the determination unit 152 to determine whether or not the composite image includes a defect (S143), and verifies whether or not a determination result similar to that obtained for the original image can be obtained (S144). That is, it is verified whether or not a defect is erroneously detected on a composite image that actually includes no defect.

If a determination result similar to that obtained for the measurement image, based on which the composite image is generated, is not obtained (S144: NO), the generation unit 121 changes the background image and the position at which the partial image is to be combined, and again generates the composite image.

On the other hand, if a determination result is obtained that is similar to that obtained for the measurement image, based on which the composite image is generated (S144: YES), the communication unit 125 inquires of the authorized person whether or not image data with which similar determination result has been obtained may be registered as new learning data (S145), while notifying the authorized person of information indicating that the first erroneous determination has been made. Here, the communication unit 125 may transmit data based on which the authorized person can make a determination, such as the measurement image based on which composition has been made, the partial image, and the composite image.

If the authorized person determines that the image data can be registered as new learning data (S146: YES), the generation unit 121 generates new learning data in which the composite image is associated with information indicating that no defect is included (S147), and stores the new learning data to the corrected image DB 122 (S148). On the other hand, if the authorized person determines that the image data is not allowed to be registered as new learning data (S146: NO), the processing is ended without registering the learning data. Then, the processing in the case of the first erroneous determination is ended.

Figure 7:
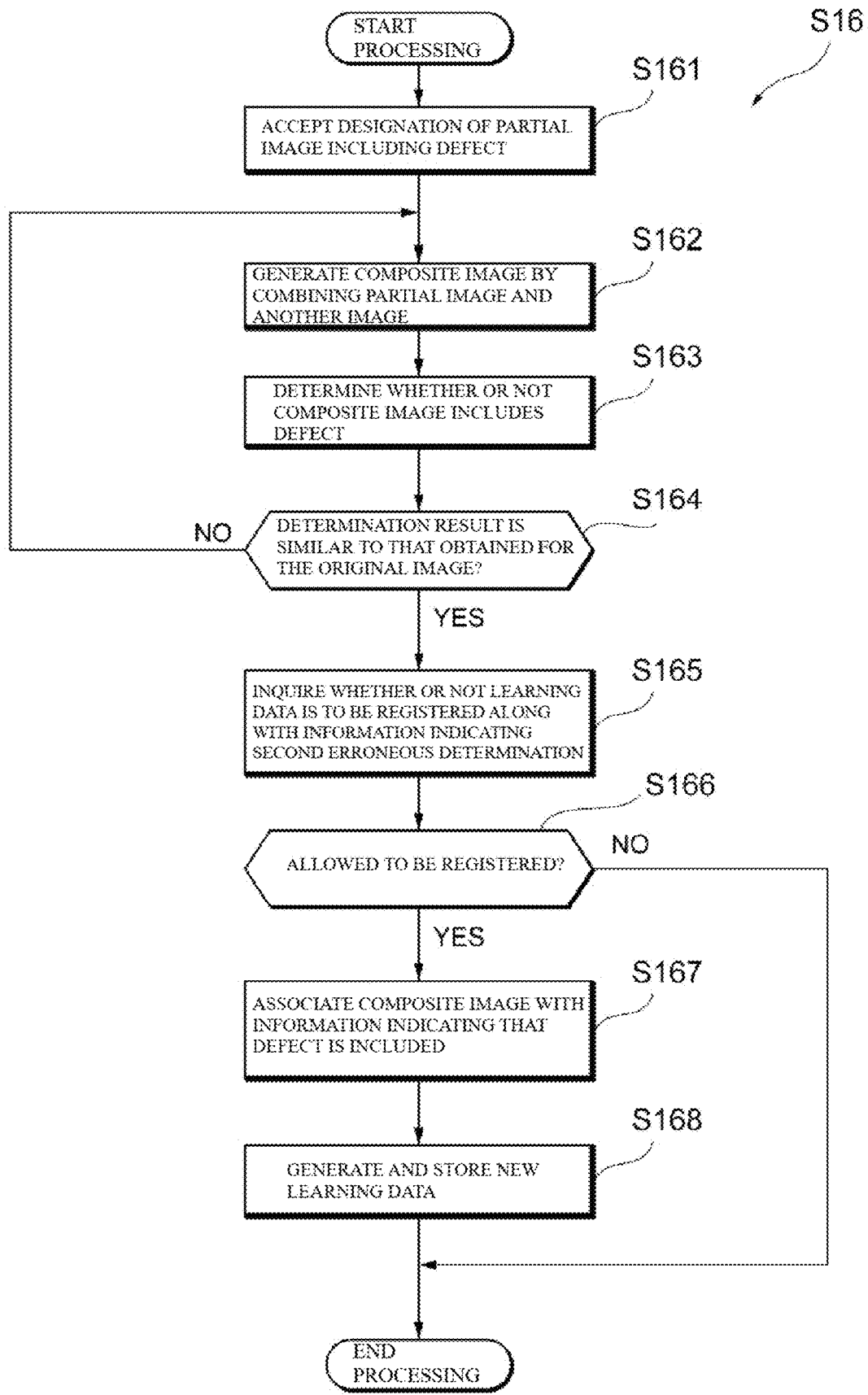
FIG. 7 is a flowchart illustrating processing to be executed by a data generation apparatus according to an embodiment in the case of second erroneous determination.

FIG. 7 is a flowchart illustrating processing to be executed by the data generation apparatus 100 according to an embodiment in the case of the second erroneous determination. When the second erroneous determination has been made, the data generation apparatus 100 accepts designation of the partial image including a defect with the user interface 170 (S161).

The data generation apparatus 100 accepts an input that designates the image with which a partial image is to be combined, and designation of the position in the image at which the partial image is to be combined with the user interface 170, and generates a composite image by combining the partial image and another image (S162). Then, the verification unit 124 causes the determination unit 152 to determine whether or not the composite image includes a defect (S163), and verifies whether or not a determination result similar to that obtained for the original image can be obtained (S164). That is, it is verified whether or not the composite image that actually includes a defect is determined to include no defect, that is, whether or not a defect is overlooked.

If a determination result similar to that obtained for the measurement image, based on which the composite image is generated, is not obtained (S164: NO), the generation unit 121 changes the background image and the position at which the partial image is to be combined, and again generates the composite image.

On the other hand, if a determination result is obtained that is similar to that obtained for the measurement image, based on which the composite image is generated (S164: YES), the communication unit 125 inquires of the authorized person whether or not image data with which similar determination result has been obtained may be registered as new learning data (S165), while notifying the authorized person of information indicating that the second erroneous determination has been made. Here, the communication unit 125 may transmit data based on which the authorized person can make a determination, such as the measurement image based on which the composite image has been generated, the partial image, and the composite image.

If the authorized person determines that the image data can be registered as new learning data (S166: YES), the generation unit 121 generates new learning data in which the composite image is associated with information indicating that a defect is included (S167), and stores the new learning data to the corrected image DB 122 (S168). On the other hand, if the authorized person determines that the image data is not allowed to be registered as new learning data (S166: NO), the processing is ended without registering the learning data. Then, the processing for the case of the second erroneous determination is ended.

Figure 8:
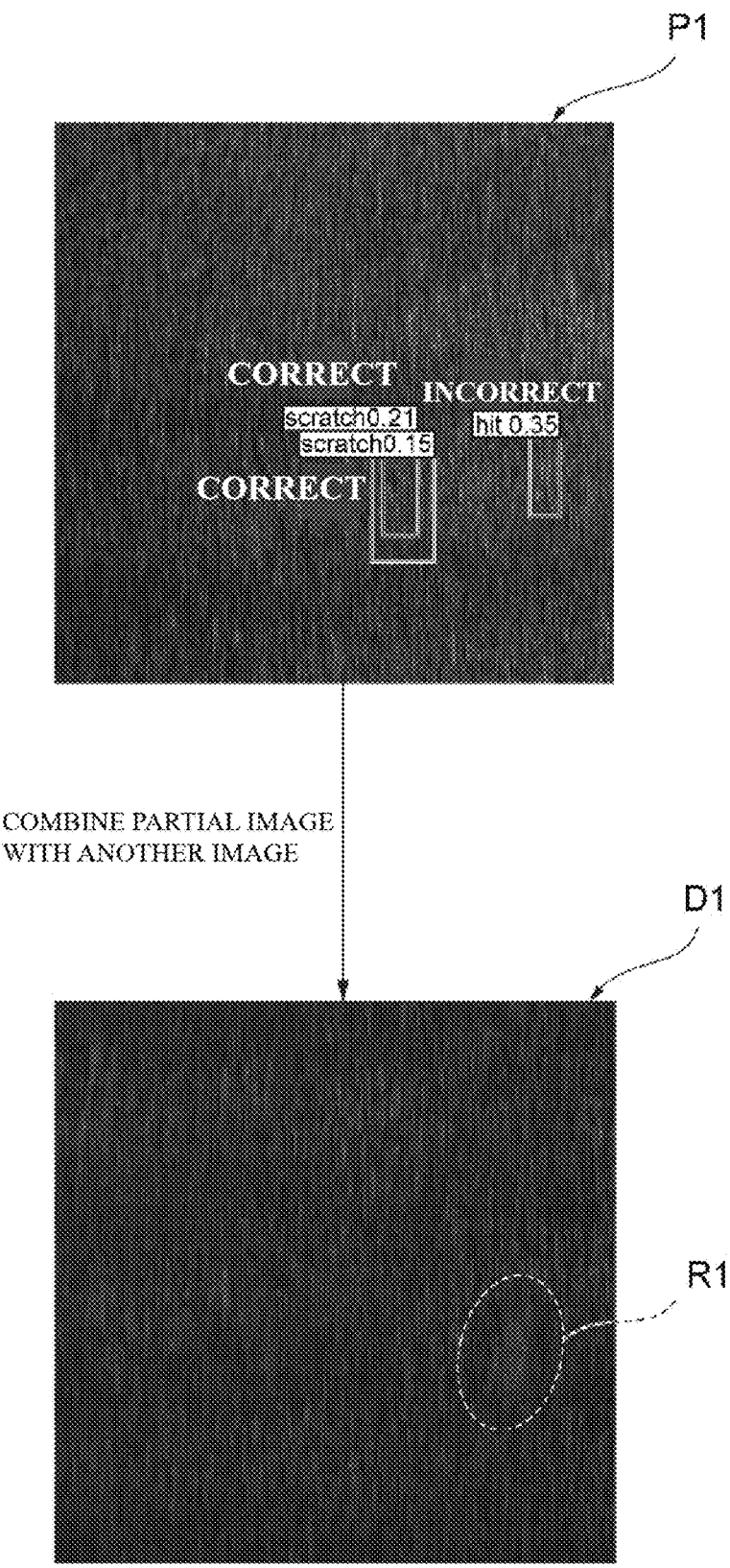
FIG. 8 is a diagram illustrating an outline of processing to be executed by a data generation apparatus according to an embodiment in the case of first erroneous determination.

FIG. 8 is a diagram illustrating an outline of processing to be executed by the data generation apparatus 100 according to an embodiment in the case of the first erroneous determination. In this diagram, an example of a result determined by the determination unit 152 that is made on a first measurement image P1 of the object to be inspected, and a first composite image D1 generated by the generation unit 121 are shown. In the first measurement image P1, information indicating correct/incorrect is given to each determination result, the information being obtained as a result of accepting an input indicating whether or not the determination result is correct, for each of a plurality of determination positions.

In the first measurement image P1 of the object to be inspected, defects determined by the determination unit 152, three frames that indicate regions determined to include the defects (position information), types of defects determined by the determination unit 152, and numerical values indicating the degree of reliability of the determination by the determination unit 152 are displayed as the determination results. Also, in the first measurement image P1, for the defects indicated by the three frames, input results are included that indicate whether or not the determination results are correct that have been input by the second operator with the user interface 170. In this example, the determination unit 152 has determined that the first measurement image P1 of the object to be inspected includes three defects. "scratch0.21" and "scratch0.15" are respectively added to the two defects located on the left side, which shows that the determination unit 152 has determined that the type of the defects is a "scratch", and the numerical values indicating the reliability are respectively 0.21 and 0.15. Also, "hit0.35" is added to the defect located on the right side of the first measurement image P1 of the object to be inspected, which shows that the determination unit 152 has determined that the type of the defect is a "hit" and the numerical value indicating the reliability is 0.35. The two defects located on the left side, of the regions determined to include a defect by the determination unit 152, are confirmed to be actual defects by the second operator, and are given the text "correct" indicating that the determination result is correct. On the other hand, the region located on the right side of the first measurement image P1 of the object to be inspected does not actually include a defect, but it is erroneously determined by the determination unit 152 that this region includes a defect. It is confirmed that the region does not include a defect by the second operator, and the text "incorrect" indicating that the determination result is incorrect is given to this defect. That is, in this example, the first erroneous determination is made on the region on the right side of the first measurement image P1 of the object to be inspected. Note that the information to be given to the first measurement image P1 that indicates whether or not the determination result is correct may also be information indicating the result obtained when the evaluation unit 127 has evaluated whether or not the determination result is correct.

The first composite image D1 is an image in which a sample image that includes no defect and a partial image extracted from a measurement image that has been erroneously determined to include a defect are combined. Here, the region R1 in which a combined partial image is included is indicated by a broken line.

The first composite image D1 is an image that looks like it does not include a defect in a visual check and that is erroneously determined to include a defect by the determination unit 152 but the cause of this erroneous determination is not obvious. When the determination unit 152 makes the first erroneous determination (false positive), it is not always apparent why the determination unit 152 has determined that the image includes a defect, and there are cases where it is difficult to plan a countermeasure to reduce the number of erroneous determinations by determining the type of learning data to be added. According to the data generation apparatus 100 according to an embodiment, as a result of generating new learning data that includes such a first composite image D1 that has been generated, and in which information indicating that the region R1 in which the combined partial image is included does not include a defect is associated with the first composite image D1, the variation of images with which the first erroneous determination might be made can be increased. That is, new learning data that is likely to lead to the erroneous determination that a defect is included (likely to erroneously detect a defect) is generated, and training can be performed using this learning data, and as a result, the accuracy of the identification device can be improved.

Figure 9:
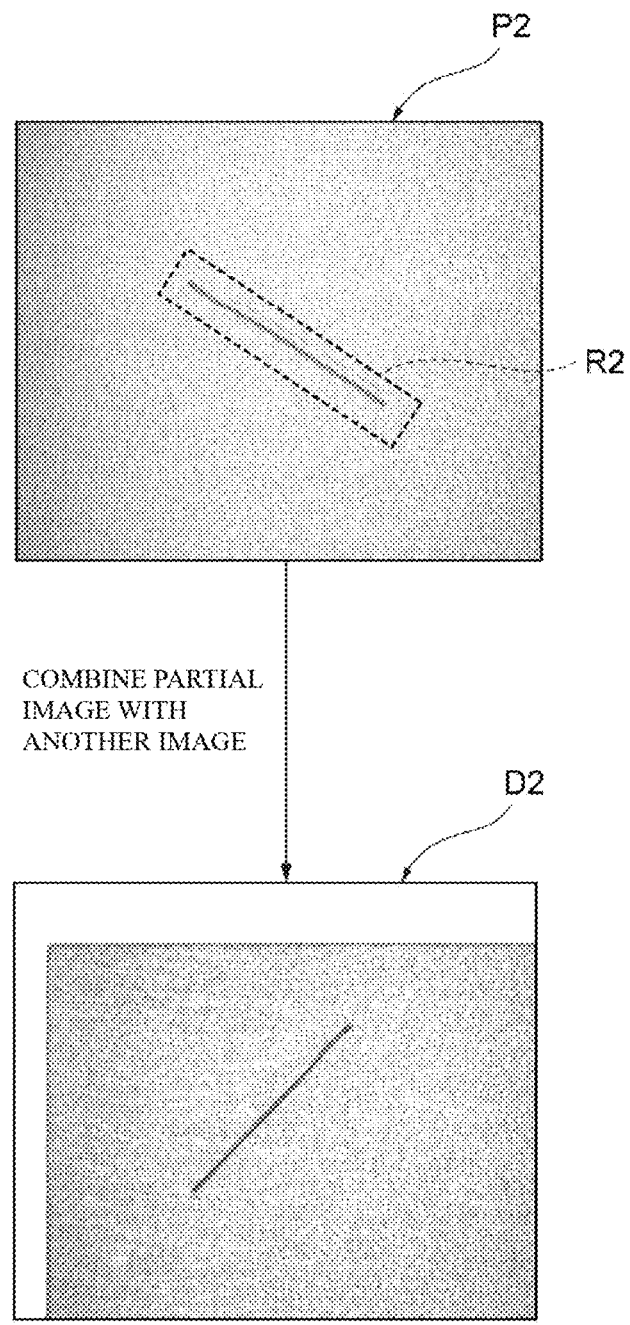
FIG. 9 is a diagram illustrating an outline of processing to be executed by a data generation apparatus according to an embodiment in the case of second erroneous determination.

FIG. 9 is a diagram illustrating an outline of processing to be executed by the data generation apparatus 100 according to an embodiment in the case of the second erroneous determination. In this diagram, an example of a second measurement image P2 of the object to be inspected and a second composite image D2 generated by the generation unit 121 is shown. In the second measurement image P2, a region R2, of the image, that includes a defect is indicated by a broken line.

In the second measurement image P2 of the object to be inspected, a defect that was overlooked by the determination unit 152, and a region R2 designated with the user interface 170 so as to surround the defect are displayed. This example shows a case where the determination unit 152 determined that no defect is included in the second measurement image P2, but an input indicating that the determination result is incorrect was made with the user interface 170, and the evaluation unit 127 also evaluated that the determination result is incorrect, and as a result, the region R2 has been input so as to include the defect, and shows an example in which the second erroneous determination is made with respect to the central region of the second measurement image P2 of the object to be inspected.

The second composite image D2 is an image obtained by combining a sample image that includes no defect and a partial image that was extracted from the second measurement image P2 that was erroneously determined to include no defect. The composite image in this example is generated by cutting out a defective portion of the region R2 designated with the user interface 170, rotating the defective portion clockwise by 90 degrees, and then combining it with an image that is different from the original image. In this way, the composite image may be generated by, after rotating, moving, deforming, changing in brightness of the defect, combining the defect with an image that is different from the original image.

The second composite image D2 is desirably an image that is erroneously determined to include no defect by the determination unit 152. When the determination unit 152 makes the second erroneous determination (false negative), it is not always apparent why the determination unit 152 has determined that the image includes no defect, and there are cases where it is difficult to plan a countermeasure to reduce the number of erroneous determinations by determining the type of learning data to be added. According to the data generation apparatus 100 according to an embodiment, as a result of generating new learning data that includes such a second composite image D2 that has been generated, and in which information indicating that a defect is included is associated with the second composite image D2, the variation of images with which the second erroneous determination might be made can be increased. That is, new learning data that is likely to lead to the erroneous determination that no defect is included (likely to overlook a defect) is generated, and training can be performed using this learning data, and as a result, the accuracy of the identification device can be improved.

4. Modifications 4.1

Figure 10:
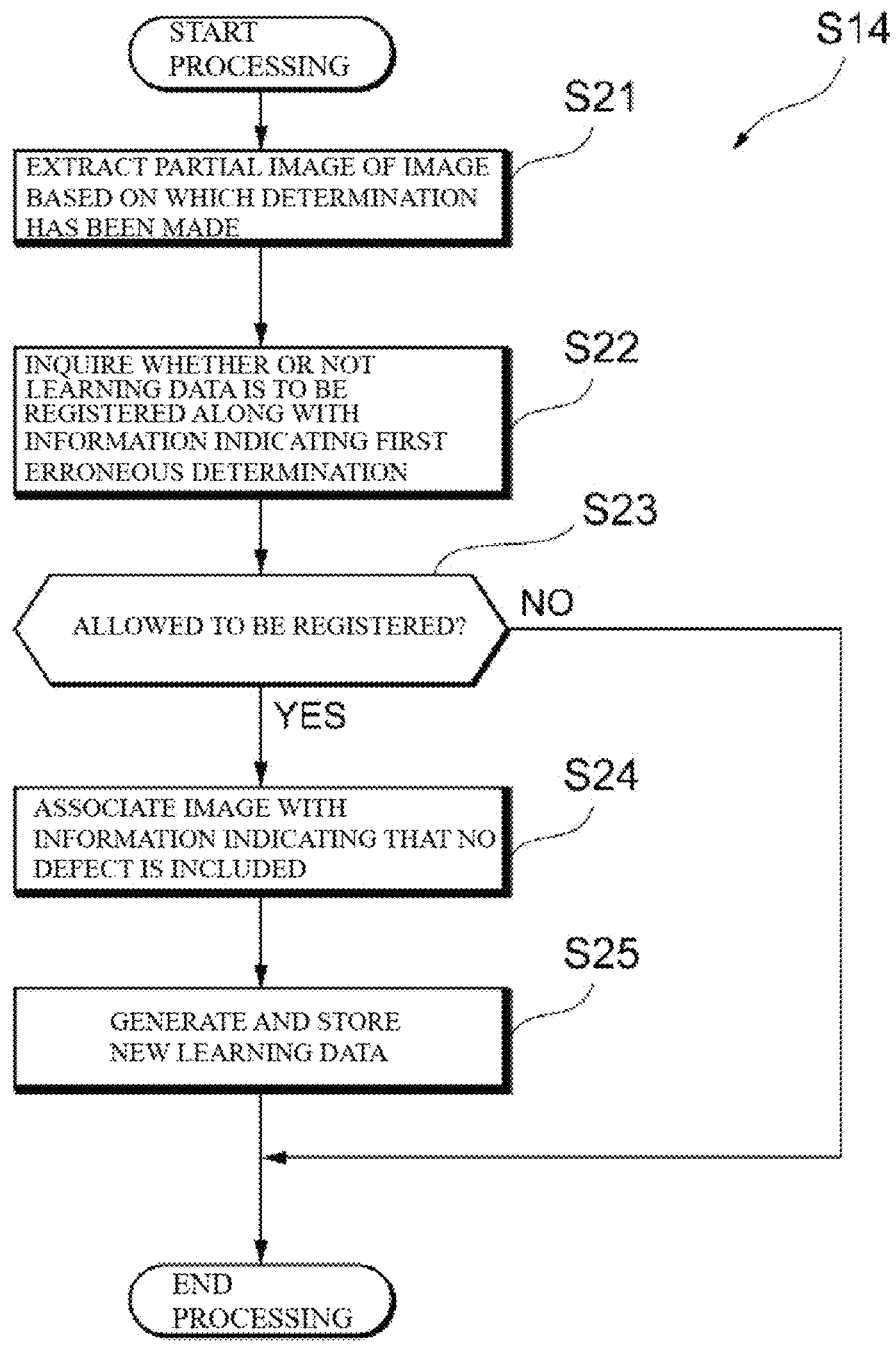
FIG. 10 is a flowchart illustrating processing to be executed by a data generation apparatus according to a modification of an embodiment in the case of first erroneous determination.

FIG. 10 is a flowchart illustrating processing to be executed by the data generation apparatus 100 according to a modification of an embodiment in the case of the first erroneous determination. If the first erroneous determination has been made, the data generation apparatus 100 according to the modification extracts a partial image of the image based on which the determination has been made (S21). The partial image may be extracted using a CAM.

Thereafter, the communication unit 125 inquires of the authorized person whether or not the image data with respect to which the first erroneous determination has been made may be registered as new learning data (S22), while notifying the authorized person of information indicating that the first erroneous determination has been made. Here, the communication unit 125 may transmit data based on which the authorized person can make a determination, such as the measurement image based on which the composite image has been generated and the partial image.

If the authorized person determines that the image data can be registered as new learning data (S23: YES), the generation unit 121 generates new learning data by associating the image with information indicating that no defect is included (S24), and stores the new learning data to the corrected image DB 122 (S25). On the other hand, if the authorized person determines that the image data is not allowed to be registered as new learning data (S23: NO), the processing is ended without registering the learning data.

Then, the processing in the case of the first erroneous determination according to the modification is ended.

Figure 11:
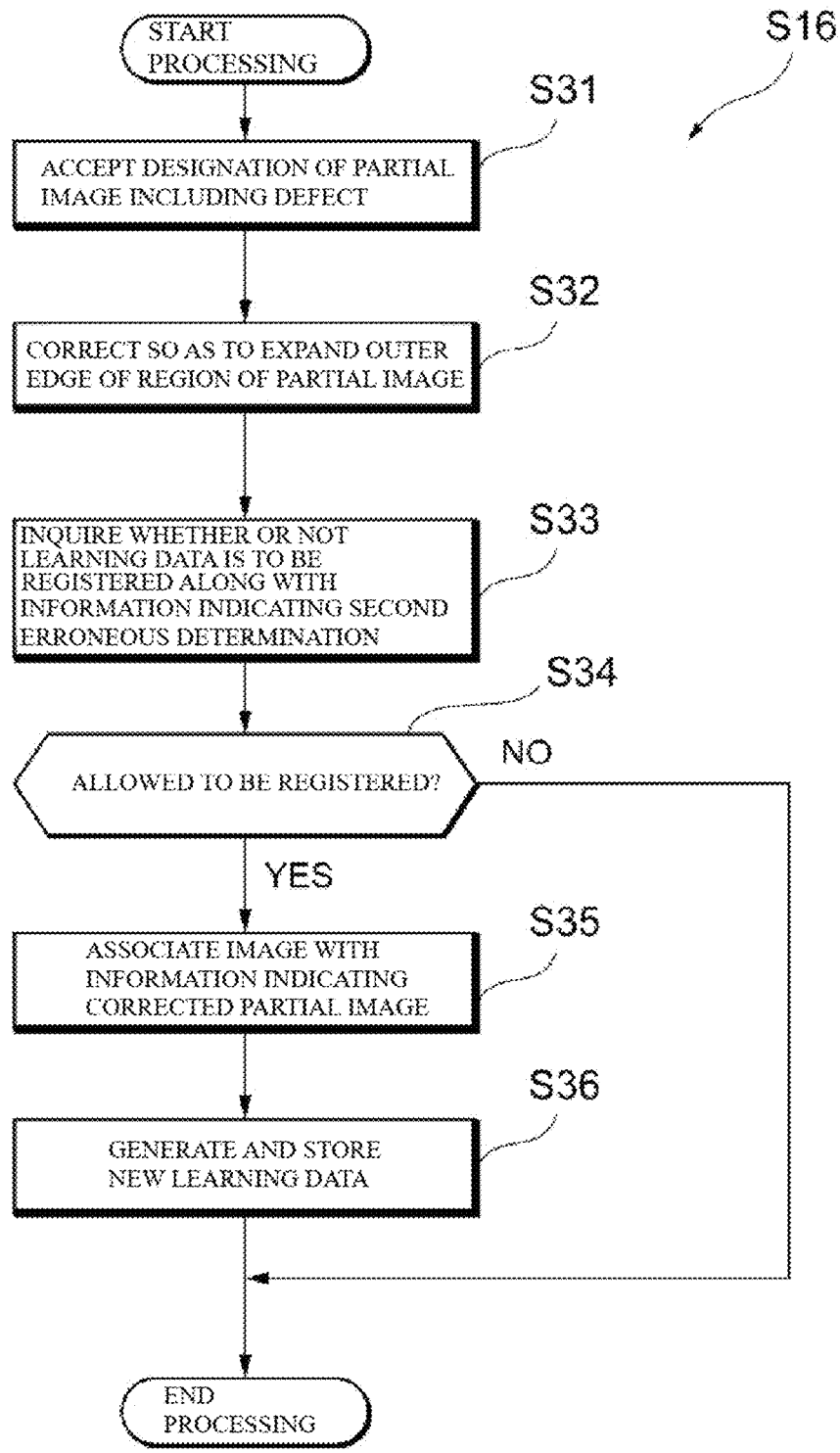
FIG. 11 is a flowchart illustrating processing to be executed by a data generation apparatus according to a modification of an embodiment in the case of second erroneous determination.

FIG. 11 is a flowchart illustrating processing to be executed by the data generation apparatus 100 according to the modification of an embodiment in the case of the second erroneous determination. If the second erroneous determination has been made, the data generation apparatus 100 according to the modification accepts designation of the partial image including a defect with the user interface 170 (S31).

The data generation apparatus 100 makes a correction using the correction unit 126 such that at least a portion of an outer edge of a region of the partial image is expanded (S32). Note that the region need not be corrected, and the correction can be omitted.

Thereafter, the communication unit 125 inquires of the authorized person whether or not the image with respect to which the second erroneous determination has been made, and that is associated with the designated region may be registered as new learning data (S33), while notifying the authorized person of information indicating that the second erroneous determination has been made. Here, the communication unit 125 may transmit data based on which the authorized person can make a determination, such as the measurement image based on which the composite image has been generated and the partial image.

If the authorized person determines that the image data can be registered as new learning data (S34: YES), the generation unit 121 generates new learning data by associating the image with information indicating that a defect is included (S35), and stores the new learning data to the corrected image DB 122 (S36). Here, the generation unit 121 may associate the image with information indicating the region that includes a defect. On the other hand, if the authorized person determines that the image data is not allowed to be registered as new learning data (S34: NO), the processing is ended without registering the learning data. Then, the processing in the case of the second erroneous determination according to the modification is ended.

Figure 12:
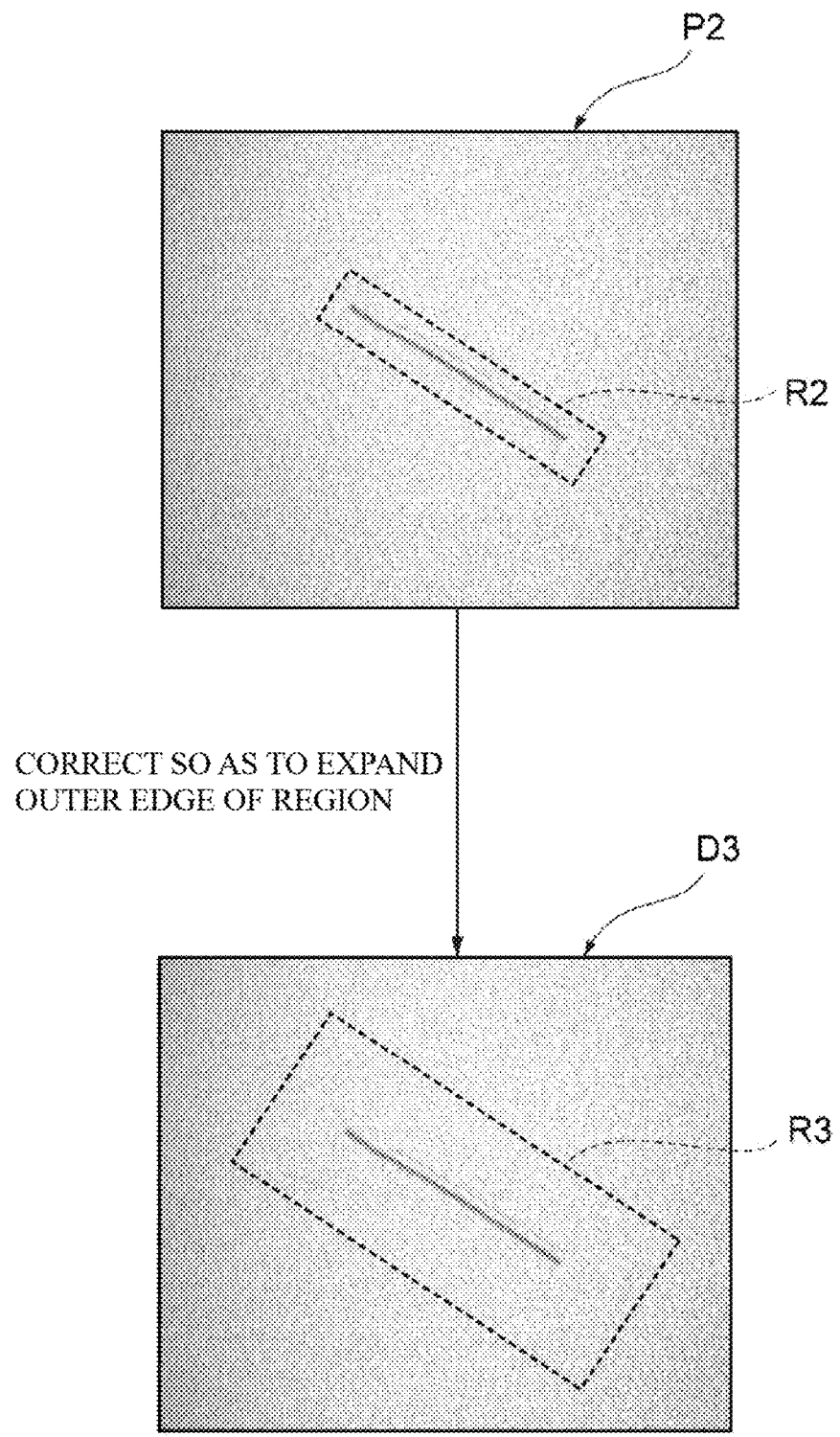
FIG. 12 is a diagram illustrating an outline of processing for correcting a region including a defect that is to be executed by a data generation apparatus according to a modification of an embodiment.

FIG. 12 is a diagram illustrating an outline of processing for correcting a region including a defect that is to be executed by the data generation apparatus 100 according to the modification of an embodiment. In this diagram, the second measurement image P2 of the object to be inspected is shown, and an example in which a region R2 surrounding a defect included in the second measurement image P2 is designated by a broken line is illustrated. Here, the region R2 may be designated by the second operator using the user interface 170. The region R2 is designated by a rectangle in which the difference in length between the long sides and the short sides is relatively large so as to surround a defect.

Learning data D3 in which a region R3 that is obtained by correcting the region R2 is associated with the second measurement image P2 is shown in the lower part of the FIG. 12. The region R3 is obtained by correcting the region R2 designated by the second operator by expanding at least a portion of the outer edge of the region such that the number of pixels included in the region is increased by a predetermined amount. In this example, the region R3 is obtained by correcting the region R2 by increasing the lengths of both the long sides and short sides. Note that the correction of the region may be performed in such a range that it does not overlap the edges or a logo of the object to be inspected, and the method of correcting a region may be determined based on the background pattern rather than the defect in the region. That is, when the region before correction does not include text and an edge of a component, the method of correction may be determined such that the corrected region will not include any text or an edge of a component.

Also, when a region before correction is rectangular, the region may be corrected to have another shape such as an elliptical shape. That is, the correction unit 126 may correct a region by changing the outer shape of the region. Furthermore, a corrected region may also be obtained by rotating the region before correction.

In this way, even if a region including a defect is designated as including almost only the defect (or defects), as a result of the region being corrected such that at least a portion of an outer edge of the region is expanded, and associating the image with information indicating the region, the region is corrected such that at least a portion of an outer edge of the region is expanded, and learning data can be generated with which an identification device can be trained so as to appropriately identify a feature of a defect included in the object to be inspected based on an image. As a result, the performance of the identification device for identifying a defect that has been trained using the learning data can be improved.

Note 1

A data generation apparatus (100) including:
an acquisition unit (150) configured to acquire a result determined by a determination unit (152), which uses an identification device (a, b, c, A, and B) trained using learning data, as to whether or not an object to be inspected includes a part to be detected based on an image of the object to be inspected;
an evaluation unit (127) configured to evaluate whether or not the result determined by the determination unit (152) is correct; and
a generation unit (121) configured to generate, if the evaluation unit (127) has evaluated that the determination result is not correct, new learning data by associating at least one of the image and a composite image generated based on the image with information in which the determination result is corrected.

Note 2

The data generation apparatus according to Note 1, wherein the generation unit (121) is configured to generate new learning data by adding information regarding whether or not a part to be detected is included, that is different between a case of a first erroneous determination in which the determination unit (152) determined that the object to be inspected includes a part to be detected, and the evaluation unit (127) has input that the determination result is not correct, and a case of a second erroneous determination in which the determination unit (152) determined that the object to be inspected includes no part to be detected, and the evaluation unit (127) has input that the determination result is not correct.

Note 3

The data generation apparatus according to Note 2, wherein the generation unit (121) is configured to generate a learning data set by mixing the new learning data generated in a case of the first erroneous determination and the new learning data generated in a case of the second erroneous determination.

Note 4

The data generation apparatus according to Note 2 or 3, wherein the generation unit (121) is configured to, in a case of the first erroneous determination, generate the new learning data by associating the image with information indicating that at least a partial image of the image based on which the determination has been made includes no part to be detected.

Note 5

The data generation apparatus according to any one of Notes 2 to 4, wherein the generation unit (121) is configured to, in a case of the first erroneous determination, generate the new learning data by generating a composite image obtained by combining a partial image of the image based on which the determination has been made and an image that is different from the image including the partial image, and by associating the composite image with information indicating that no part to be detected is included.

Note 6

The data generation apparatus according to any one of Notes 2 to 4, wherein the generation unit (121) is configured to, in a case of the second erroneous determination, generate the new learning data by associating the image with information indicating that at least the image includes a part to be detected.

Note 7

The data generation apparatus according to Note 6,
wherein information indicating that the part to be detected is included includes information indicating a region of the image that includes the part to be detected,
the data generation apparatus further includes a correction unit (126) configured to correct information indicating the region by expanding at least a portion of an outer edge of the region so that the number of pixels included in the region is increased by a predetermined amount, and
the generation unit (121) is configured to generate learning data by associating the image with information indicating the corrected region.

Note 8

The data generation apparatus according to any one of Notes 2 to 7, wherein the generation unit (121) is configured to, in a case of the second erroneous determination, generate the composite image by combining a partial image, of the image, that includes the part to be detected and an image that is different from the image including the partial image, and generate the new learning data by associating the composite image with information indicating that a part to be detected is included.

Note 9

The data generation apparatus according to Note 5 or 8,
wherein the part to be detected is a defective part included in the object to be inspected, and
the data generation apparatus further includes a verification unit (124) configured to cause the determination unit (152) to determine whether or not the composite image includes a defect, and verify whether or not the first erroneous determination or the second erroneous determination is made.

Note 10

The data generation apparatus according to any one of Notes 2 to 9, further including a communication unit (125) configured to, when the generation unit (121) generates the new learning data, inquire of an authorized person as to whether or not the new learning data should be registered, while notifying the authorized person of information indicating which of the first erroneous determination and the second erroneous determination has been made.

Note 11

An inspection apparatus including a determination unit (152) configured to determine whether or not the object to be inspected includes a part to be detected based on the image using an identification device (a, b, c, A, and B) trained using new learning data that has been generated by the data generation apparatus (100) according to any one of Notes 1 to 10.

Note 12

A data generation method including;

acquiring a result determined by a determination unit (152), which uses an identification device (a, b, c, A, and B) trained using learning data, as to whether or not an object to be inspected includes a part to be detected based on an image of the object to be inspected;

evaluating whether or not the result determined by the determination unit (152) is correct; and generating, if the evaluation unit (127) has evaluated that the determination result is not correct, new learning data by associating at least one of the image and a composite image generated based on the image with information in which the determination result is corrected.

Note 13

A data generation program for causing a computation apparatus included in a data generation apparatus to function as;

an acquisition unit (150) configured to acquire a result determined by a determination unit (152), which uses an identification device (a, b, c, A, and B) trained using learning data, as to whether or not an object to be inspected includes a part to be detected based on an image of the object to be inspected;

an evaluation unit (127) configured to evaluate whether or not the result determined by the determination unit (152) is correct; and a generation unit (121) configured to generate, if the evaluation unit (127) has evaluated that the determination result is not correct, new learning data by associating at least one of the image and a composite image generated based on the image with information in which the determination result is corrected.

The invention claimed is:

1. A data generation apparatus comprising:
a processor configured with a program to perform operations comprising:
operation as a determination unit configured to determine a result indicating whether an object to be inspected includes a defect, using an identification device trained using learning data;
operation as an evaluation unit configured to accept an input specifying whether the result determined by the determination unit is correct; and
operation as a generation unit configured to generate, in response to the evaluation unit specifying that the determination result is not correct, new learning data by associating at least one of the image and a composite image generated based on the image with information in which the determination result is corrected.

2. The data generation apparatus according to claim 1, wherein the processor is configured with the program such that operation the generation unit comprises generating the new learning data by adding information regarding whether the defect is included in the object to be inspected, the new learning data being different between:
a case of a first erroneous determination in which the determination unit determined that the object to be inspected includes the defect and the evaluation unit has specified that the determination result is not correct, and
a case of a second erroneous determination in which the determination unit determined that the object to be inspected includes no defect and the evaluation unit has specified that the determination result is not correct.

3. The data generation apparatus according to claim 2, wherein the processor is configured with the program such that operation as the generation unit comprises generating a learning data set by mixing the new learning data generated in the case of the first erroneous determination and the new learning data generated in the case of the second erroneous determination.

4. The data generation apparatus according to claim 2, wherein the processor is configured with the program such that operation as the generation unit comprises, in the case of the first erroneous determination, generating the new learning data by associating the image with information indicating that at least a partial image of the image based on which the determination has been made includes no defect.

5. The data generation apparatus according to claim 2, wherein the processor is configured with the program such that operation as the generation unit comprises, in the case of the first erroneous determination, generating the new learning data by generating a composite image obtained by combining a partial image of the image based on which the determination has been made and an image that is different from the image including the partial image, and by associating the composite image with information indicating that no defect is included.

6. The data generation apparatus according to claim 2, wherein the processor is configured with the program such that operation as the generation unit comprises, in the case of the second erroneous determination, generating the new learning data by associating the image with information indicating that the image includes the defect.

7. The data generation apparatus according to claim 6, wherein information indicating that the defect is included includes information indicating a region of the image that includes the defect,
the processor is further configured with the program to perform operations comprising operation as a correction unit configured to correct information indicating the region by expanding at least a portion of an outer edge of the region so that the number of pixels included in the region is increased by a predetermined amount, and
the processor is configured with the program such that operation as the generation unit comprises generating the learning data by associating the image with information indicating the corrected region.

8. The data generation apparatus according to claim 2, wherein the processor is configured with the program such that operation as the generation unit comprises, in the case of the second erroneous determination, generating the composite image by combining a partial image of the image that includes the part to be detected and an image that is different from the image including the partial image, and generate the new learning data by associating the composite image with information indicating that the defect is included.

9. The data generation apparatus according to claim 5, wherein
the processor is further configured with the program to perform operations comprising operation as verification unit configured to cause the determination unit to determine whether the composite image includes the defect, and verify whether the first erroneous determination or the second erroneous determination is made.

10. The data generation apparatus according to claim 2, wherein the processor is further configured with the program to perform operations comprising operation as a communication unit configured to, in response to the generation unit generating the new learning data, inquire of an authorized person as to whether the new learning data should be registered, while notifying the authorized person of information indicating which of the first erroneous determination and the second erroneous determination has been made.

11. An inspection apparatus comprising a processor configured with a program to perform operation as a determination unit configured to determine, based on an image of an object to be inspected, whether the object to be inspected includes a defect, using an identification device trained using new learning data that has been generated by the data generation apparatus according to claim 1.

12. The data generation apparatus according to claim 3, wherein the processor is configured with the program such that operation as the generation unit comprises, in the case of the first erroneous determination, generating the new learning data by associating the image with information indicating that at least a partial image of the image based on which the determination has been made includes no defect.

13. The data generation apparatus according to claim 3, wherein the processor is configured with the program such that operation as the generation unit comprises, in the case of the first erroneous determination, generating the new learning data by generating a composite image obtained by combining a partial image of the image based on which the determination has been made and an image that is different from the image including the partial image, and by associating the composite image with information indicating that no defect is included.

14. The data generation apparatus according to claim 4, wherein the processor is configured with the program such that operation as the generation unit comprises, in the case of the first erroneous determination, generating the new learning data by generating a composite image obtained by combining a partial image of the image based on which the determination has been made and an image that is different from the image including the partial image, and by associating the composite image with information indicating that no defect is included.

15. The data generation apparatus according to claim 3, wherein the processor is configured with the program such that operation as the generation unit comprises, in the case of the second erroneous determination, generating the new learning data by associating the image with information indicating that the image includes the defect.

16. The data generation apparatus according to claim 4, wherein the processor is configured with the program such that operation as the generation unit comprises, in the case of the second erroneous determination, generating the new learning data by associating the image with information indicating that at least the image includes the defect.

17. The data generation apparatus according to claim 5, wherein the processor is configured with the program such that operation as the generation unit comprises, in the case of the second erroneous determination, generating the new learning data by associating the image with information indicating that at least includes the defect.

18. A data generation method comprising:
   determining a result indicating whether an object to be inspected includes a defect, using an identification device trained using learning data, based on an image of the object to be inspected;
   accepting an input specifying whether the determination result is correct; and
   generating, in response to the input specifying that the determination result is not correct, new learning data by associating at least one of the image and a composite image generated based on the image with information in which the determination result is corrected.

19. A non-transitory computer-readable storage medium storing a data generation program, when read and executed, causing a processor included in a data generation apparatus to perform operations comprising:
   determining a result indicating whether an object to be inspected includes a defect, using an identification device trained using learning data, based on an image of the object to be inspected;
   accepting an input specifying whether the determination result is correct; and
   generating, in response to the input specifying that the determination result is not correct, new learning data by associating at least one of the image and a composite image generated based on the image with information in which the determination result is corrected.

* * * * *